(12) United States Patent
Ichikawa et al.

(10) Patent No.: US 7,403,345 B2
(45) Date of Patent: Jul. 22, 2008

(54) ZOOM OPTICAL SYSTEM AND ELECTRONIC IMAGING APPARATUS USING THE SAME

(75) Inventors: Keisuke Ichikawa, Hachioji (JP); Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/726,528

(22) Filed: Mar. 21, 2007

(65) Prior Publication Data
US 2008/0117525 A1    May 22, 2008

(30) Foreign Application Priority Data
Nov. 22, 2006    (JP) .............................. 2006-316191

(51) Int. Cl.
*G02B 9/34* (2006.01)
*G02B 15/14* (2006.01)

(52) U.S. Cl. ........................ 359/781; 359/676; 359/686

(58) Field of Classification Search ................. 359/676, 359/682, 686, 715, 753, 781
See application file for complete search history.

(56) References Cited

U.S. PATENT DOCUMENTS

| 6,349,002 B1 | 2/2002 | Shibayama et al. |
| 2002/0008920 A1 | 1/2002 | Mihara et al. |
| 2002/0057502 A1 | 5/2002 | Ishii et al. |
| 2005/0030641 A1* | 2/2005 | Kuba et al. ................. 359/686 |

OTHER PUBLICATIONS

Patent Abstracts of Japan, Publication No. 11-211984, Aug. 6, 1999, and English translation of the Abstract.

* cited by examiner

*Primary Examiner*—Alicia M Harrington
(74) *Attorney, Agent, or Firm*—Kenyon & Kenyon LLP

(57) ABSTRACT

A zoom optical system comprises in order from an object side, the first lens group consisting of one cemented lens in which each of the surfaces contacted with air is aspherical, and having negative refracting power as a whole, the second lens group consisting of one positive single lens and one cemented lens, and having positive refracting power as a whole, the third lens group of one negative lens having an aspherical surface, and the fourth lens group consisting of one positive lens having an aspherical surface. When magnification is carried out, each of the lens groups is moved while changing each relative distance among the lens groups.

18 Claims, 12 Drawing Sheets

FIG.2A
SPHERICAL ABERRATION
FNO 1.860
FIG.2B
ASTIGMATISM
IH=3.60
FIG.2C
DISTORTION
IH=3.60
FIG.2D
CHROMATIC ABERRATION OF MAGNIFICATION
IH=3.60
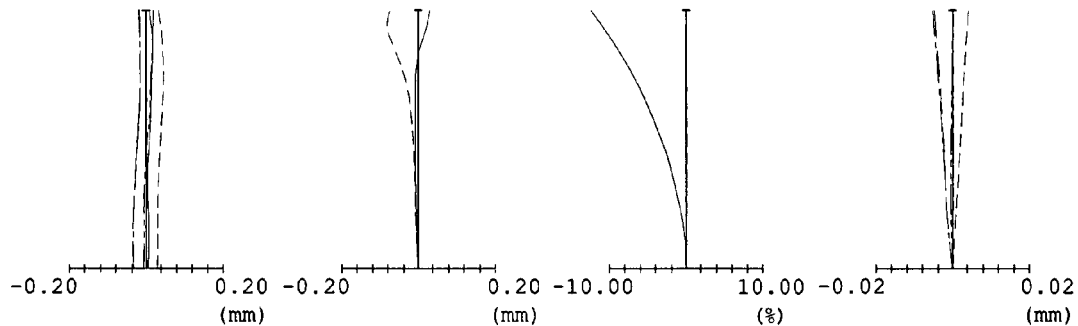
FIG.2E
SPHERICAL ABERRATION
FNO 2.453
FIG.2F
ASTIGMATISM
IH=3.60
FIG.2G
DISTORTION
IH=3.60
FIG.2H
CHROMATIC ABERRATION OF MAGNIFICATION
IH=3.60
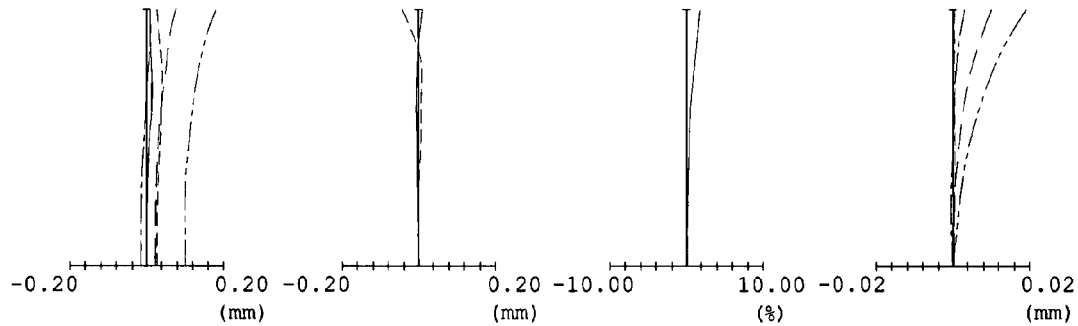
FIG.2I
SPHERICAL ABERRATION
FNO 3.404
FIG.2J
ASTIGMATISM
IH=3.60
FIG.2K
DISTORTION
IH=3.60
FIG.2L
CHROMATIC ABERRATION OF MAGNIFICATION
IH=3.60
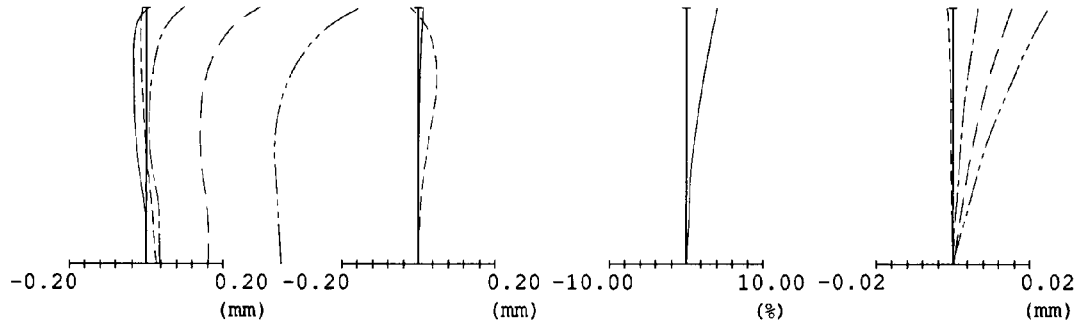
404.66 —·—·—   486.13 —··—··—   587.56 ———
435.84 — — —   656.27 ----------

FIG.4A SPHERICAL ABERRATION FNO 1.878

FIG.4B ASTIGMATISM IH=3.60

FIG.4C DISTORTION IH=3.60

FIG.4D CHROMATIC ABERRATION OF MAGNIFICATION IH=3.60

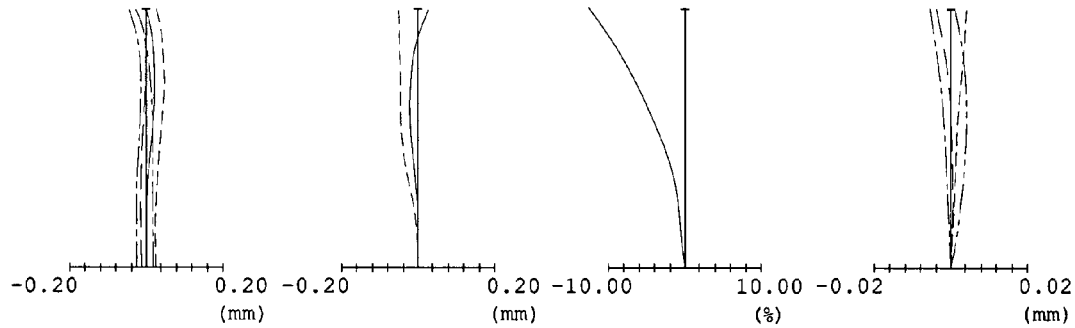
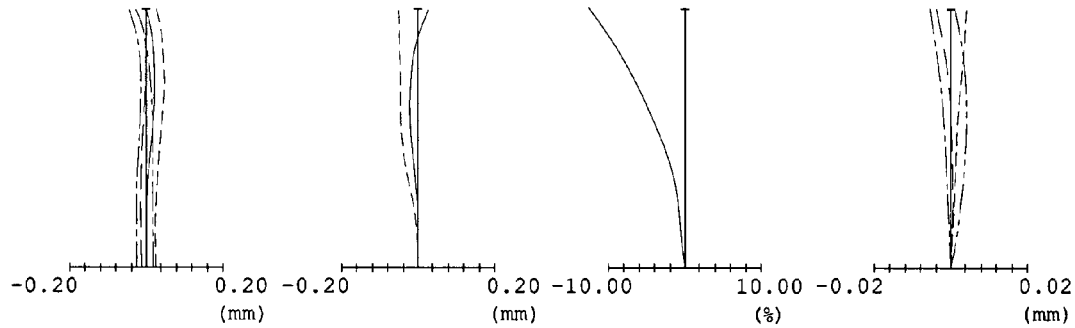
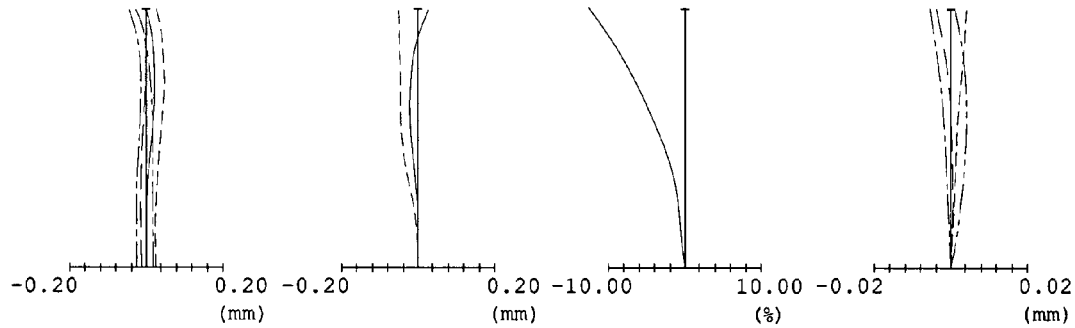
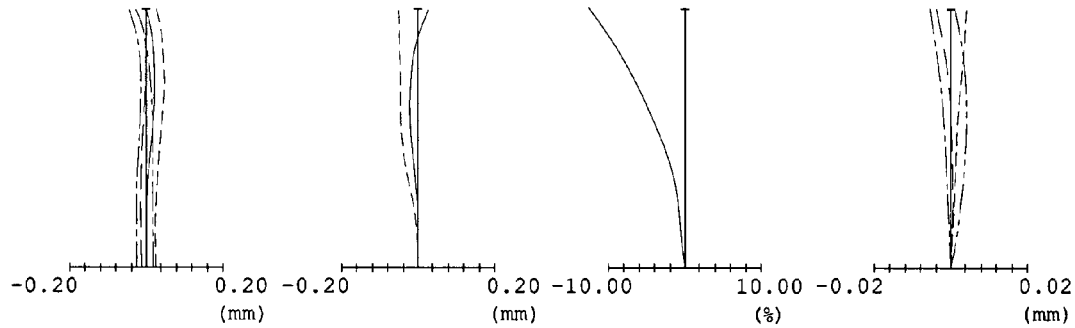

FIG.4E SPHERICAL ABERRATION FNO 2.483

FIG.4F ASTIGMATISM IH=3.60

FIG.4G DISTORTION IH=3.60

FIG.4H CHROMATIC ABERRATION OF MAGNIFICATION IH=3.60

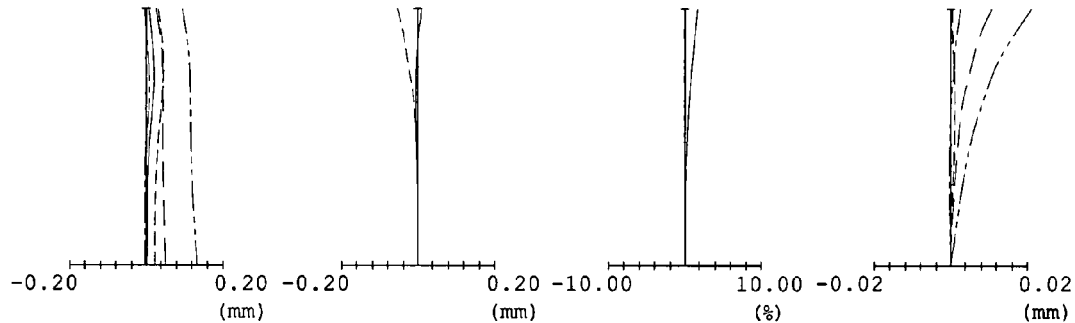
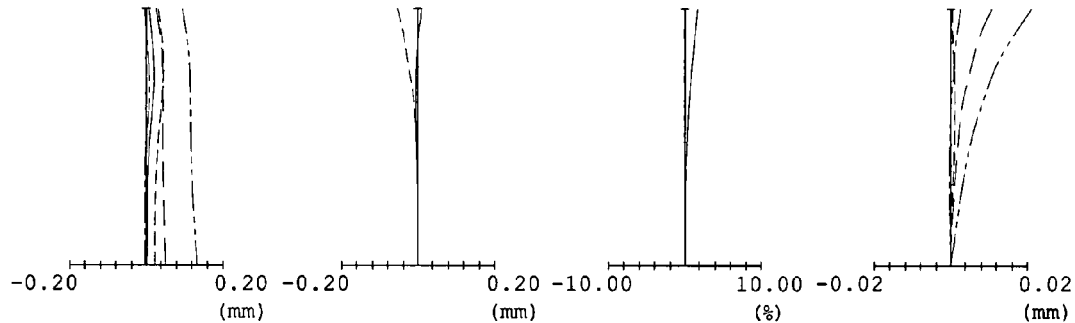
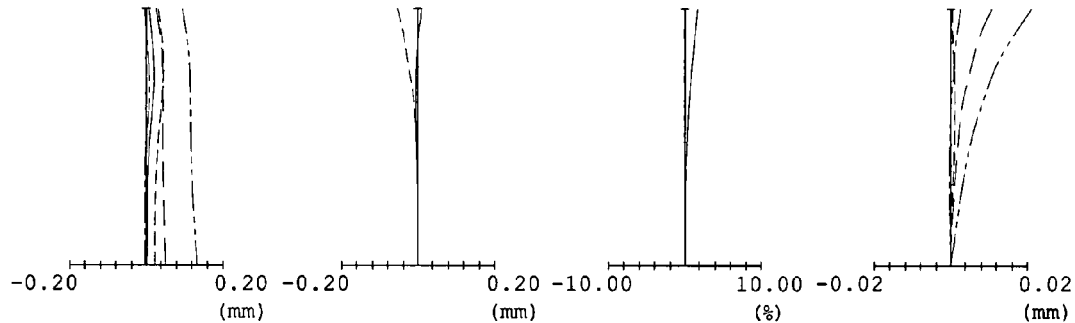
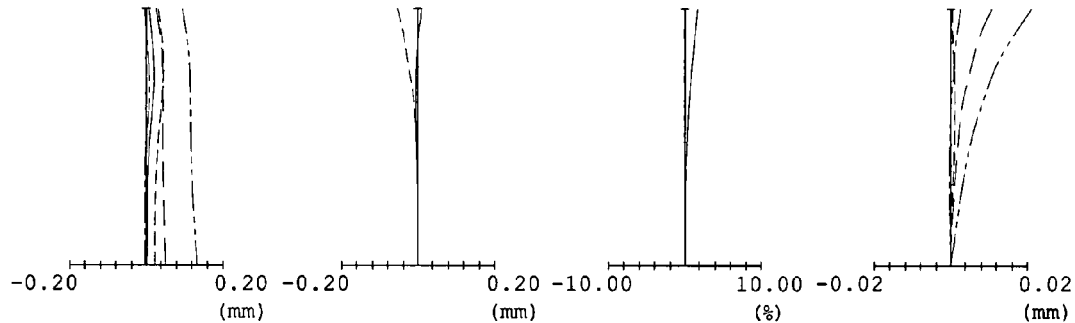

FIG.4I SPHERICAL ABERRATION FNO 3.434

FIG.4J ASTIGMATISM IH=3.60

FIG.4K DISTORTION IH=3.60

FIG.4L CHROMATIC ABERRATION OF MAGNIFICATION IH=3.60

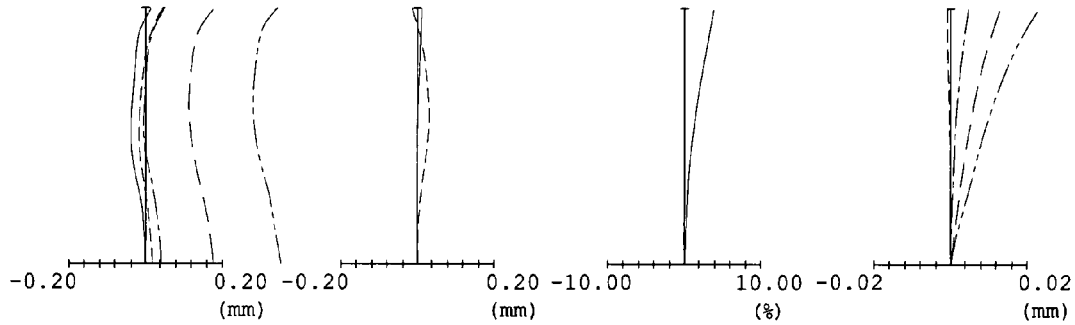
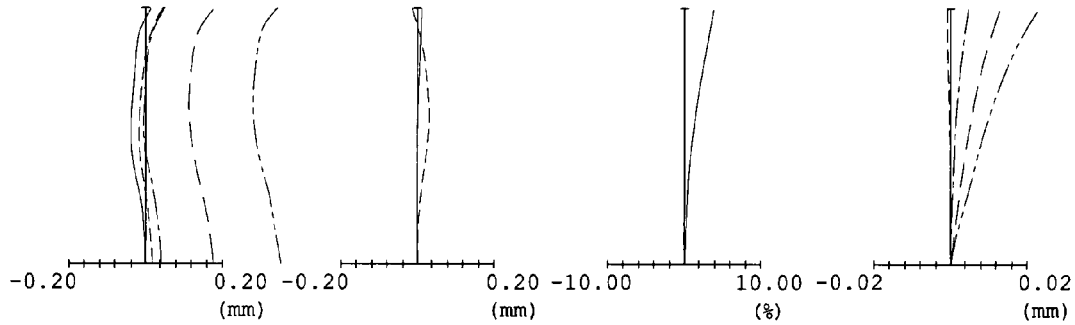
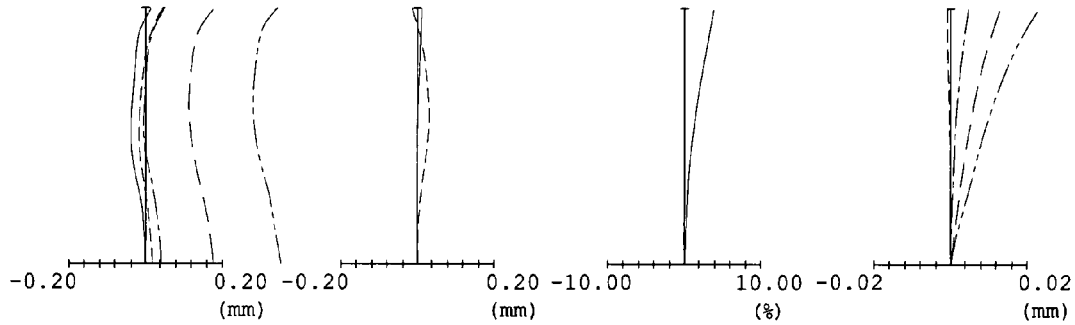
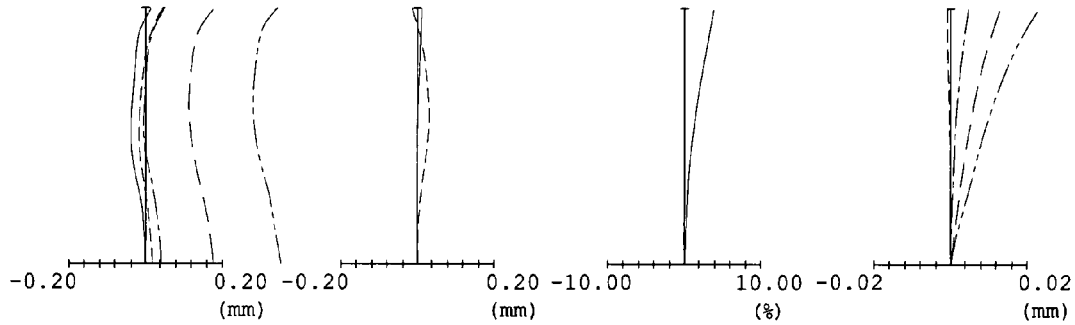

404.66  435.84  486.13  656.27  587.56

| FIG.6A | FIG.6B | FIG.6C | FIG.6D |
|---|---|---|---|
| SPHERICAL ABERRATION | ASTIGMATISM | DISTORTION | CHROMATIC ABERRATION OF MAGNIFICATION |
| FNO 1.879 | IH=3.60 | IH=3.60 | IH=3.60 |

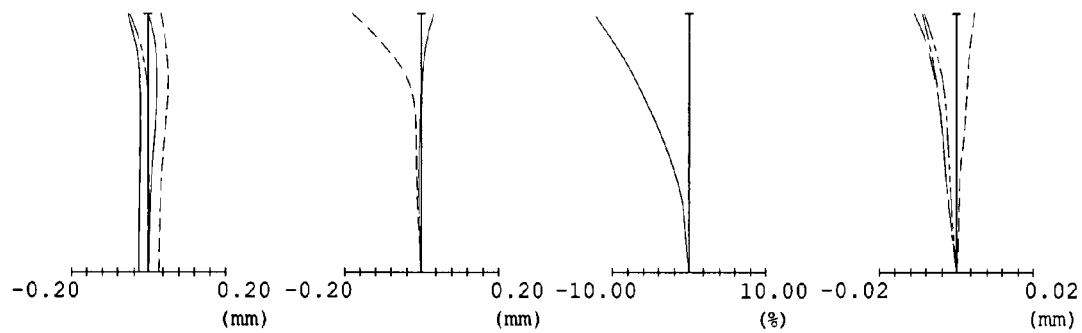

| FIG.6E | FIG.6F | FIG.6G | FIG.6H |
|---|---|---|---|
| SPHERICAL ABERRATION | ASTIGMATISM | DISTORTION | CHROMATIC ABERRATION OF MAGNIFICATION |
| FNO 2.496 | IH=3.60 | IH=3.60 | IH=3.60 |

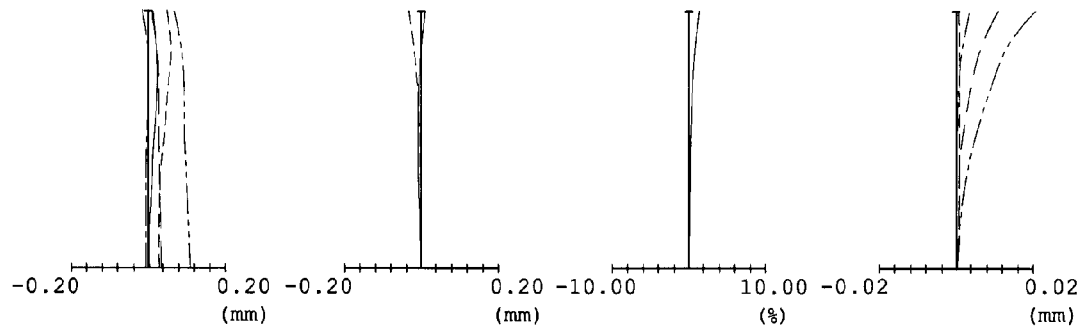

| FIG.6I | FIG.6J | FIG.6K | FIG.6L |
|---|---|---|---|
| SPHERICAL ABERRATION | ASTIGMATISM | DISTORTION | CHROMATIC ABERRATION OF MAGNIFICATION |
| FNO 3.441 | IH=3.60 | IH=3.60 | IH=3.60 |

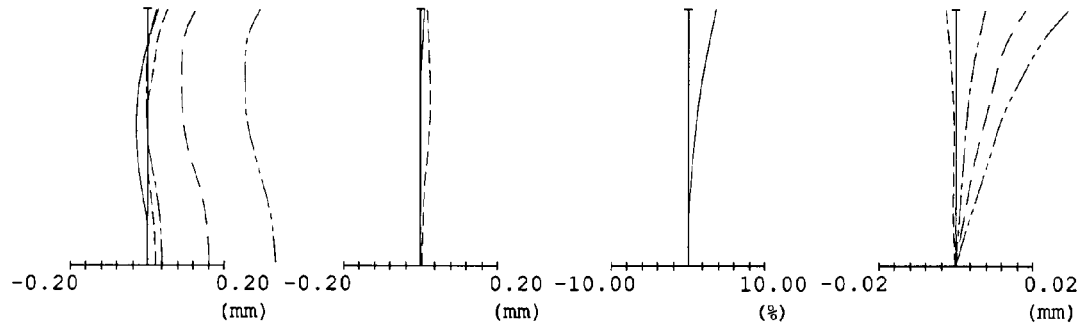

404.66 — · · —    486.13 — — —    587.56 ———
435.84 — — — —    656.27 - - - - -

FIG.8A
SPHERICAL ABERRATION
FNO 1.998
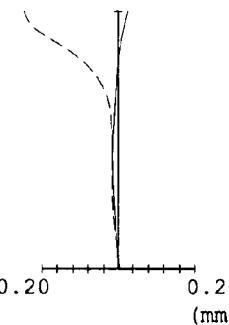
FIG.8B
ASTIGMATISM
IH=3.60
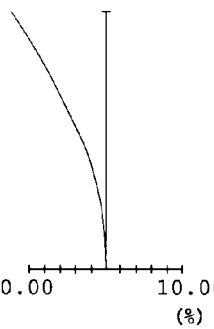
FIG.8C
DISTORTION
IH=3.60
FIG.8D
CHROMATIC ABERRATION OF MAGNIFICATION
IH=3.60
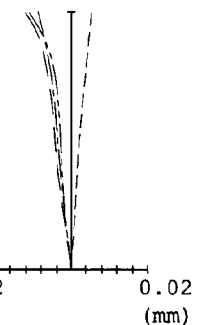
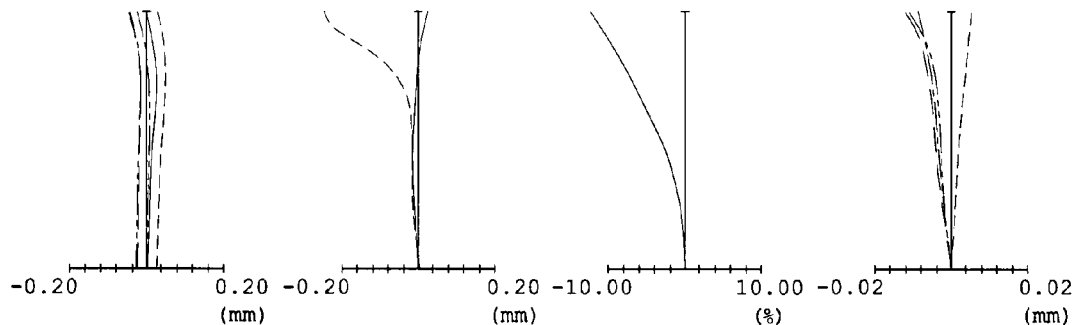
FIG.8E
SPHERICAL ABERRATION
FNO 2.642
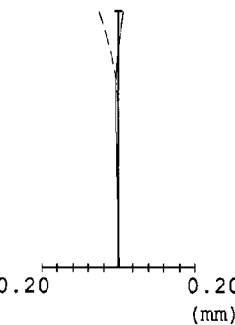
FIG.8F
ASTIGMATISM
IH=3.60
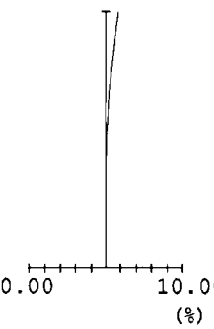
FIG.8G
DISTORTION
IH=3.60
FIG.8H
CHROMATIC ABERRATION OF MAGNIFICATION
IH=3.60
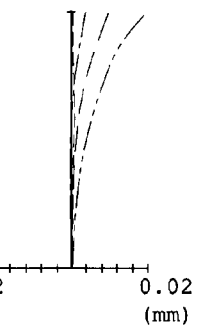
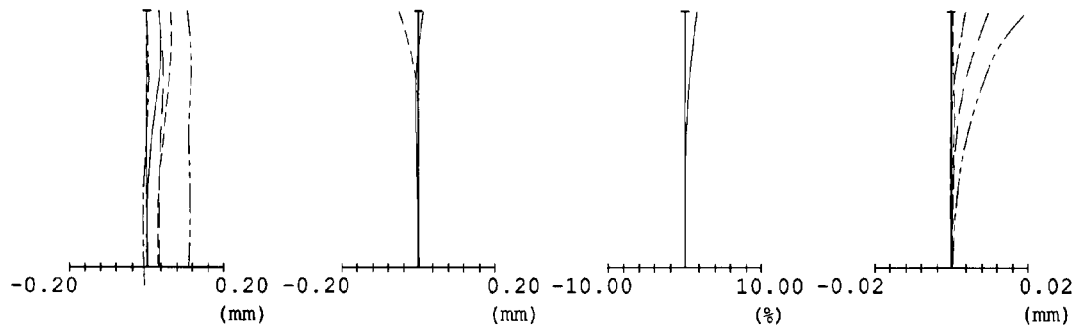
FIG.8I
SPHERICAL ABERRATION
FNO 3.628
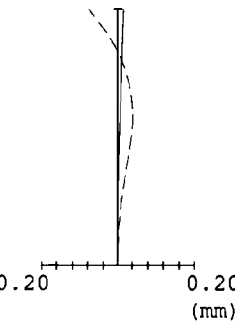
FIG.8J
ASTIGMATISM
IH=3.60
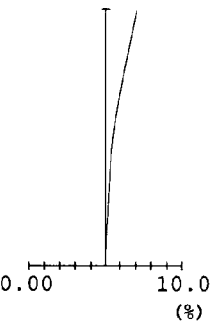
FIG.8K
DISTORTION
IH=3.60
FIG.8L
CHROMATIC ABERRATION OF MAGNIFICATION
IH=3.60
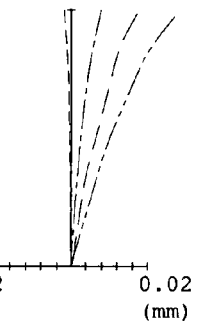
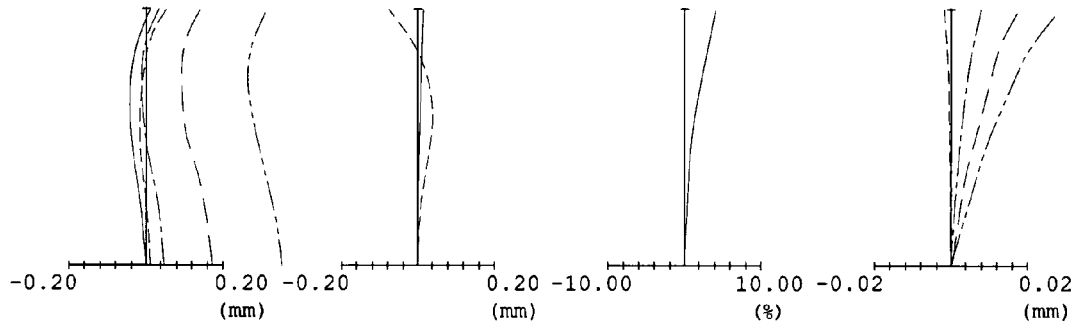
404.66 — · · —   486.13 — · —   587.56 ———
435.84 — — —   656.27 - - - - -

FIG.10A SPHERICAL ABERRATION FNO 1.866

FIG.10B ASTIGMATISM IH=3.60

FIG.10C DISTORTION IH=3.60

FIG.10D CHROMATIC ABERRATION OF MAGNIFICATION IH=3.60

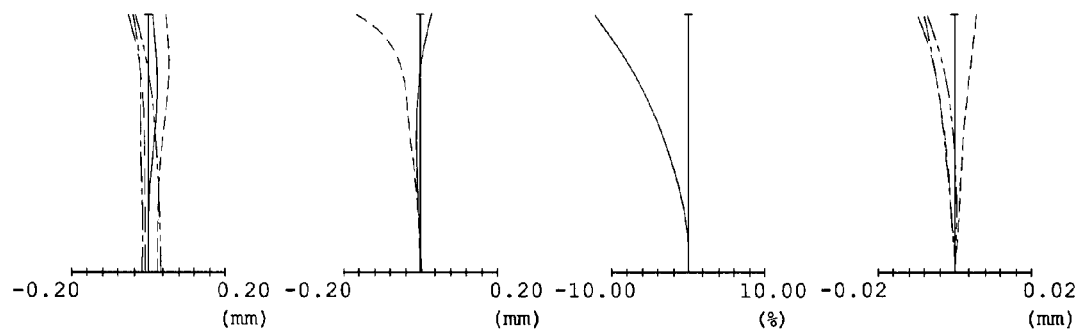

FIG.10E SPHERICAL ABERRATION FNO 2.466

FIG.10F ASTIGMATISM IH=3.60

FIG.10G DISTORTION IH=3.60

FIG.10H CHROMATIC ABERRATION OF MAGNIFICATION IH=3.60

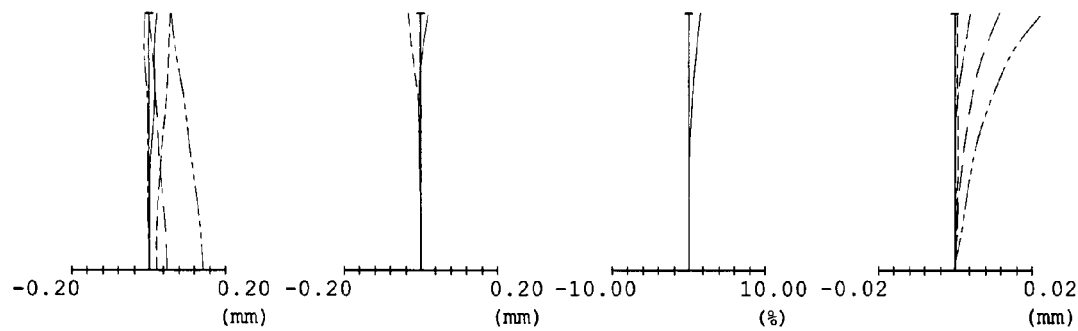

FIG.10I SPHERICAL ABERRATION FNO 3.391

FIG.10J ASTIGMATISM IH=3.60

FIG.10K DISTORTION IH=3.60

FIG.10L CHROMATIC ABERRATION OF MAGNIFICATION IH=3.60

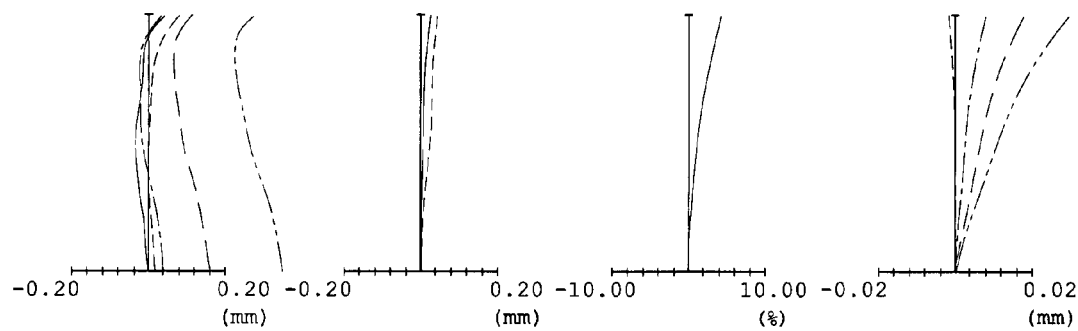

404.66 —·—·—   486.13 —··—··—   587.56 ———
435.84 — — —   656.27 — — — — —

ZOOM OPTICAL SYSTEM AND ELECTRONIC IMAGING APPARATUS USING THE SAME

This application claims benefits of Japanese Patent Application No. 2006-316191 filed in Japan on Nov. 22, 2006, the contents of which are hereby incorporated by reference.

BACKGROUND OF THE INVENTION

1. Field of the Invention

The present invention relates to a zoom optical system which is an optical system suitable for especially an electronic imaging optical system, and has a large aperture, and is excellent at an image forming performance, and an electronic imaging apparatus using the this zoom optical system.

2. Description of the Related Art

The technology of digital camera has reached to practical use level in realizing a high pixel number (high quality picture), or a small thinning in size. Consequently, the digital camera has taken place for silver halide 35 mm film camera not only in function but also in market. Under such circumstance, there is a performance such that a photographic subject can be finely photographed even in an environment with little amount of light as one of performances required in the next step. Thus, also in an optical system, while high image forming performance and thinning of it which have so far been achieved are kept as it is, a large aperture ratio has been demanded intensely.

So far, a positive refracting power preceding type zoom optical system has been known as a zoom optical system suitable for large aperture ratio. The positive refracting power preceding type zoom optical system comprises, in order from an object side, a first lens group having positive refracting power, a second lens group having negative refracting power, a third lens group having positive refracting power, and a fourth lens group having positive refracting power.

On the other hand, a negative preceding type zoom optical system has been known as a zoom optical system suitable for thinning. This negative preceding type zoom optical system comprises in order from the object side, a first lens group having negative refracting power, a second lens group having positive refracting power, and a third lens group having positive refracting power.

SUMMARY OF THE INVENTION

A zoom optical system according to the present invention comprises in order from an object side, a lens group A having negative refracting power as a whole which consists of one cemented lens component in which each of surfaces contacted with air is an aspherical surface, and a lens group B having positive refracting power as a whole which consists of one positive single lens and one cemented lens component, a lens group C which consists of one negative lens having an aspherical surface, and a lens group D which consists of one positive lens having an aspherical surface, wherein each of lens groups is moved while changing each relative distance among the lens groups when magnification is carried out. In the zoom optical system of the present invention, it is desired that the lens group A consists of a cemented lens component in which a positive lens $L_{AP}$ and a negative lens $L_{AN}$ are cemented, and the negative lens $L_{AN}$ has a double concave surface, and the positive lens $L_{AP}$ has a meniscus form having a concave surface directed toward an image side.

In the zoom optical system of the present invention, it is desired that the positive lens $L_{AP}$ is a lens using energy hardening type resin which is formed directly on the negative lens $L_{AN}$.

In the zoom optical system of the present invention, it is desired that a cemented lens component of the lens group A is constituted such that the negative lens $L_{AN}$ and the positive lens $L_{AP}$ are cemented in order from the object side.

In the zoom optical system of the present invention, when an aspherical surface is expressed by the following formula (1), where a direction of an optical axis is z; a direction which intersects perpendicularly to the optical axis is h; a cone coefficient is k; and an aspherical coefficient is represented by A4, A6, A8, and A10; and a radius of curvature of spherical surface component on the optical axis is R;

$$z = \frac{h^2}{R\left[1 + \left\{1 - (1+k)\frac{h^2}{R^2}\right\}^{\frac{1}{2}}\right]} + A_4 h^4 + A_6 h^6 + A_8 h^8 + A_{10} h^{10} + \quad (1)$$

it is desirable to satisfy the following condition (2).

$$0.1 \leq |z_{AR}(h) - z_{AC}(h)|/tp \leq 0.96 \quad (2)$$

here, $z_{AC}$ is a form of the surface at a cemented side according to the condition (1) in the positive lens $L_{AP}$; $z_{AR}$ is a form of a surface contacted with air according to the condition (1) in the positive lens $L_{AP}$, h is h=0.7fw when the focal length of the whole zoom optical system at the wide angle end is set to fw; tp is a thickness on the optical axis of the positive lens $L_{AP}$; and always z(0)=0.

In the zoom optical system of the present invention, when an aspherical surface is expressed by the following formula (I), where a direction of an optical axis is z; a direction which intersects perpendicularly to the optical axis is h; a cone coefficient is k; and an aspherical coefficient is represented by A4, A6, A8, and A10; and a radius of curvature of spherical surface component on the optical axis is R;

$$z = \frac{h^2}{R\left[1 + \left\{1 - (1+k)\frac{h^2}{R^2}\right\}^{\frac{1}{2}}\right]} + A_4 h^4 + A_6 h^6 + A_8 h^8 + A_{10} h^{10} + \quad (1)$$

it is desired that conditions (4), (5), and (6) are satisfied, $$-50 \leq k_{AF} \leq 10 \quad (4)$$

$$-20 \leq k_{AR} \leq 20 \quad (5)$$

$$-8 \leq z_{AF}(h)/z_{AR}(h) \leq 2 \quad (6)$$

here, $k_{AF}$ is k value concerning a surface at the most object side in the lens group A; $k_{AR}$ is k value concerning a surface at the most image side in the lens group A all of which are k values in the condition (1); $z_{AF}$ is a form of a surface at the most object side in the lens group A; and $z_{AR}$ is a form of a surface at the most image side in the lens group A; and h is h=0.7 fw when the focal length of the whole zoom optical system at the wide angle end is set to fw.

In the zoom optical system of the present invention, when magnification from a wide angle end to a telephoto end is carried out, it is desired that the lens group A moves toward an image side at first, and then it moves toward an object side along the optical axis, that is to say, it moves to two directions (toward the image side and the object side). In the zoom optical system of the present invention, it is desired that the lens group B satisfies the following conditions (13) and (14).

$$1.77 \leq {}_{AVE}nd_{2P} \quad (13)$$

$$vd_{2N} \leq 27 \quad (14)$$

here, ${}_{AVE}nd_{2P}$ is an average of refractive indexes (refractive indexes to d line) of all positive lenses in the lens group B; and $vd_{2N}$ is Abbe number of a negative lens in the lens group B.

In the zoom optical system of the present invention, it is desired that the lens group D has a stronger curvature of a surface at the image side than that of a surface at the object side, and a surface directed toward the object side is an aspherical surface.

In the zoom optical system of the present invention, it is desired that the lens group D satisfies the following conditions (15) and (16).

$$1.77 \leq nd_{4P} \quad (15)$$

$$34 \leq vd_{4P} \quad (16)$$

here, $nd_{4P}$ is refractive index of the lens group D to d line; $vd_{4P}$ is Abbe number of the lens group D to d line.

In the zoom optical system of the present invention, it is desired that the lens groups C has a double concave form.

In the zoom optical system of the present invention, it is desired that the lens groups C has a double concave form. In the zoom optical system of the present invention, if a distance between the lens group C and the lens group D on the optical axis is expressed by $d_{CD}$ when focusing is carried out at the infinite object point at the wide angle end, it is desirable to satisfy the following condition (17).

$$0.2 \leq d_{CD}/fw \leq 1.2 \quad (17)$$

here, fw is a focal length of the whole zoom optical system at the wide angle end.

In the zoom optical system of the present invention, it is desired that when magnification from the wide angle end to the telephoto end carried out, the lens group C and the lens group D move together while a relative distance between them is extended simply, or the lens group D approaches toward the image side.

In the zoom optical system of the present invention, it is desired that the lens group C and the lens group D move together while changing a mutual distance between them when focusing is carried out.

In the zoom optical system of the present invention, it is desired that a distance between the lens C and the lens D is narrowed when focusing is carried out at the object point at nearer position by moving the lens group C and the lens group D in such state that the lens group A and the lens group B are stopped moving.

The imaging apparatus provided with the zoom optical system according to the present invention is characterised in that it comprises a zoom optical system, and an electronic imaging element arranged at near an image forming position of the zoom optical system wherein an image formed through the zoom optical system is photographed by the electronic imaging element, and the image data picked up by the electronic imaging element is processed electrically, and the image data form which has been changed can be output, and furthermore the zoom optical system satisfies the following condition (20) when focusing at a near infinite object point is carried out.

$$0.7 < y_{07}/(fw \cdot \tan \omega_{07w}) < 0.94 \quad (20)$$

here, $y_{07}$ is expressed by $y_{0.7} = 0.7 y_{10}$ when a distance to the most distant point from a center (maximum image height) within an effective image pick-up surface of the electronic imaging element (within the surface in which photographing can be carried out) is set to $y_{10}$; $\omega_{07w}$ is an angle to the optical axis of the direction of an object point corresponding to an image point connected to the position of $y_{07}$ from the center on the image pick-up surface at a wide angle end; and fw is a focal length of the whole zoom optical system at the wide angle end.

When the first lens group A is constituted by one lens component only, aberrations get worse easily. This becomes an obstacle against achieving large aperture ratio. According to the present invention, even if the first lens group is constituted with only one lens component, chromatic aberration, astigmatism, spherical aberration, and coma aberration can be corrected good. Consequently, a zoom optical system having large aperture ratio, and an imaging apparatus provided with the same can be obtained. Moreover, as the first lens group is constituted with only one lens component, a length of collapsible type lens holding body can be made thin. Thereby, in a zoom optical system, thinning of shape as well as a large aperture ratio can be achieved.

BRIEF DESCRIPTION OF THE DRAWINGS

FIGS. 2A~2D, 2E~2H, and 2I~2L are figures showing spherical aberration, astigmatism, distortion, distortion, distortion, and chromatic aberration of magnification respectively when focusing is carried out at the infinite object point of the zoom optical system of FIG. 1, and show states in the wide angle end, the middle position, and the telephoto end, respectively.

FIGS. 4A~4D, 4E~4H, and 4I~4L are figures showing spherical aberration, astigmatism, distortion, distortion, distortion, and chromatic aberration of magnification respectively, when focusing is carried out at the infinite object point of the zoom optical system of FIG. 3, and show states in the wide angle end, the middle position, and the telephoto end, respectively.

FIGS. 6A~6D, 6E~6H, and 6I~6L are figures showing spherical aberration, astigmatism, distortion, distortion, and chromatic aberration of magnification respectively, when focusing is carried out at the infinite object point of the zoom optical system of FIG. 5, and show states in the wide angle end, the middle position, and the telephoto end, respectively.

FIGS. 8A~8D, 8E~8H, and 8I~8L are figures showing spherical aberration, astigmatism, distortion, and chromatic aberration of magnification respectively when focusing is carried out at the infinite object point of the zoom optical system of FIG. 7, and show states in the wide angle end, the middle position, and the telephoto end, respectively.

FIGS. 10A~10D, 10E~10H, and 10I~10L are figures showing spherical aberration, astigmatism, distortion, and chromatic aberration of magnification respectively, when focusing is carried out at the infinite object point of the zoom optical system of FIG. 9, and show states in the wide angle end, the middle position, and the telephoto end, respectively.

DETAILED DESCRIPTION OF THE PREFERRED EMBODIMENTS

Figure 1A:
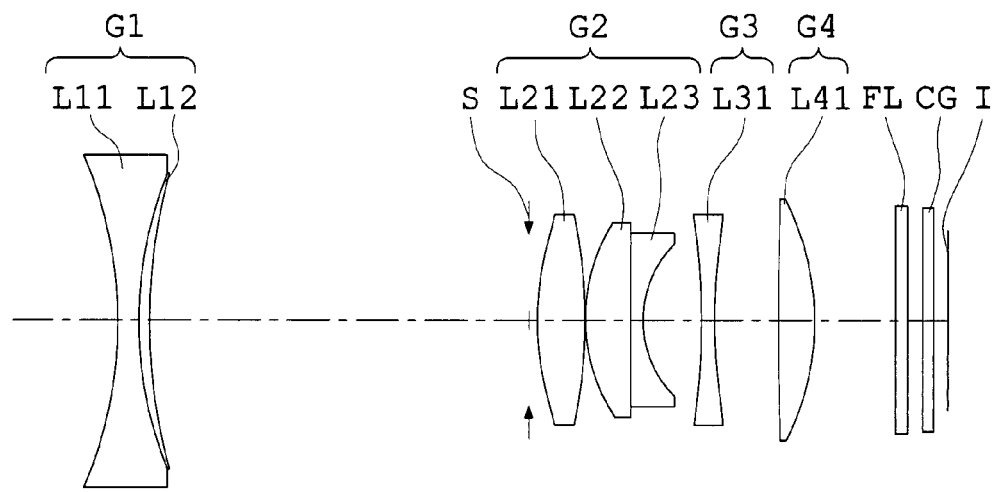
FIGS. 1A, 1B and 1C are sectional views showing an optical arrangement developed along an optical axis at a wide angle end, a middle position and a telephoto end respectively of the zoom lens system when focusing is carried out at the infinite object point in an embodiment 1 according to the present invention.

Prior to explanation of embodiments, function and effect of the present invention will be explained.

A zoom optical system of the present invention comprises a lens group A having negative refracting power as a whole which consists of one cemented lens component in which each of surfaces contacted with air is an aspherical surface, a lens group B having positive refracting power as a whole which consists of one positive single lens and one cemented lens component, a lens group C which consists of one negative lens having an aspherical surface, and a lens group D which consists of one positive lens having an aspherical surface wherein each of lens groups is moved while changing each relative distance among the lens groups when magnification is carried out.

By such constitution as mentioned above, in a thin type zoom optical system, high image forming performance can be maintained, and bright F value can be secured.

In this case, by constituting such that the lens group A consists of a cemented lens component in which a negative lens $L_{AN}$ and a positive lens $L_{AP}$ are cemented in order from the object side wherein the negative lens $L_{AN}$ is made a double concave form, and the positive lens $L_{AP}$ is made a meniscus form having a concave directed toward the image side, thinning of the zoom lens system can be achieved irrespective to large aperture ratio. Especially, it is desired that in the positive lens $L_{AP}$, a concave surface at the image side is directed toward the image side. For achieving a thin optical system, it is good to use as an optical material of the positive lens $L_{AP}$, organic materials including resin and the like, or, other materials optical characteristics of which are changed by diffusing inorganic particulates into such organic materials. If such optical materials are used, it is possible to process the positive lens $L_{AP}$ as a thin lens.

Furthermore, it is good to adopt a cemented lens in order to process (to form) the positive lens $L_{AP}$ as thin as possible.

That is, this positive lens $L_{AP}$ is directly formed on the negative lens $L_{AN}$, using an energy hardening type resin as an optical material of the positive lens $L_{AP}$. In this way, the positive lens $L_{AP}$ can be made thin. As the energy hardening type resin, there is ultraviolet curing type resin, for example. In this case, taking into consideration of durability of the resin, it is desired that the cemented lens component of the lens group A is constituted such that the negative lens $L_{AN}$ and the positive lens $L_{AP}$ are cemented in order from the object side.

As to lens form, it is good to satisfy the followings.

When an aspherical surface is expressed by the following condition (1), where a direction of an optical axis is z; a direction which intersects perpendicularly to the optical axis is h; a cone coefficient is k; and an aspherical coefficient is represented by A4, A6, A8, and A10; and a radius of curvature of spherical surface component on the optical axis is R; it is desirable to satisfy the following condition (2).

$$z = \frac{h^2}{R\left[1 + \left\{1 - (1+k)\frac{h^2}{R^2}\right\}^{\frac{1}{2}}\right]} + A_4 h^4 + A_6 h^6 + A_8 h^8 + A_{10} h^{10} + \quad (1)$$

$$0.1 \leq |z_{AR}(h) - z_{AC}(h)|/tp \leq 0.96 \quad (2)$$

here, $z_{AC}$ is a form of the surface at a cemented side in the positive lens $L_{AP}$; $z_{AR}$ is a form of the surface contacted with air in the positive lens $L_{AP}$ all of which are forms according to the condition (1); h is expressed by h=0.7fw when the focal length of the whole zoom optical system at the wide angle end is set to fw; tp is a thickness on the optical axis of the positive lens $L_{AP}$; and always z(0)=0.

If it is less than the lower limit of the condition (2), chromatic aberration cannot be fully corrected. On the other hand, if it exceeds the maximum value of the condition (2), it becomes difficult to secure a thickness of edge of the peripheral portion in the positive lens $L_{AP}$. Namely, when the positive lens $L_{AP}$ is processed to be formed thin, although it is necessary to secure a predetermined size for the thickness of edge of the peripheral portion, it becomes difficult to secure the thickness of the edge of the peripheral portion having the predetermined size.

It is much desired that the following condition (2') is satisfied instead of the condition (2).

$$0.3 \leq |z_{AR}(h) - z_{AC}(h)|/tp \leq 0.94 \quad (2')$$

It is the best if the following condition (2") is satisfied instead of the condition (2).

$$0.5 \leq |z_{AR}(h) - z_{AC}(h)|/tp \leq 0.92 \quad (2'')$$

When a thickness on the optical axis of the negative lens $L_{AN}$ of the lens group A is set to tn, it is good if the following condition (3) is satisfied, $$0.3 \leq tp/tn \leq 1.3 \quad (3)$$

Or, as to a surface form at the most object side, and a surface form at the most image side of the lens group A, astigmatism can be corrected effectively as follows. That is, when a form of an aspherical surface is expressed by the condition (1), it is good that the conditions (4) and (5) are satisfied, and furthermore the condition (6) is satisfied;

$$-50 \leq k_{AF} \leq 10 \quad (4)$$

$$-20 \leq k_{AR} \leq 20 \quad (5)$$

$$-8 \leq z_{AF}(h)/z_{AR}(h) \leq 2 \quad (6)$$

here, $k_{AF}$ is k value concerning a surface at the most object side in the lens group A; $k_{AR}$ is k value concerning a surface at the most image side in the lens group A, all of which are k values in the condition (1); $z_{AF}$ is k value concerning a surface at the most object side in the lens group A; $z_{AR}$ is a surface form at the most image side in the lens group A; and h is expressed by h=0.7fw when the focal length of the whole zoom optical system at the wide angle end is set to fw.

If it exceeds the upper limit of the condition (6), it is easy to become disadvantageous for correction of astigmatism. On the other hand, if it is less than the lower limit of the condition (6), an amount of generated distortion becomes remarkably large. Therefore, even if the distortion is corrected by using the image processing function mentioned later, by such correction, a peripheral portion of a pictorial image will be expanded to a radiation direction (direction which runs from a center of the pictorial image to a peripheral portion). Consequently, resolution of meridional direction of the peripheral portion gets worse easily. It is much desired that the following condition (6') is satisfied instead of the condition (6).

$$-4 \leq z_{AF}(h)/z_{AR}(h) \leq 0 \quad (6')$$

Furthermore, it is the best if the following condition (6") is satisfied instead of the condition (6).

$$-2 \leq z_{AF}(h)/z_{AR}(h) \leq -0.3 \quad (6'')$$

In the zoom optical system of the present invention, when magnification from a wide angle end to a telephoto end is carried out, it is good that the lens group A moves toward an image side at first, and then it moves toward the object side and the image side along the optical axis. By such constitution mentioned above, whole length of the optical system can be shortened and accordingly, it is effective in thinning when a lens holding body is collapsible type. In the zoom optical system of the present invention, it is better to carry out chromatic aberration correction well in order to get a large aperture ratio. Accordingly, it is good if the positive lens $L_{AP}$ (an optical material used for the positive lens $L_{AP}$) of the lens group A satisfies the following conditions. namely, in a rectangular coordinate system in which a horizontal axis is expressed by vdp and an vertical axis is expressed by θgFp, when a straight line expressed by θgFp=αp×vdp+βp(αp=−0.00163) is set up, vdp and θgFp of positive lens $L_{AP}$ are made to be included in both of a domain which is specified by a straight line at a lower limit of the following condition (7) and by a straight line at the maximum value of the condition (7), and a domain which is specified by the following condition (8).

$$0.6400 \leq \beta p \leq 0.9000 \quad (7)$$

$$3 < vdp < 27 \quad (8)$$

here, θgFp is a ratio of a partial dispersion (ng−nF)/(nF−nC) of the positive lens $L_{AP}$; vdp is Abbe number (nd−1)/(nF−nC) of the positive lens $L_{AP}$; nd is refractive index to d line; nC is refractive index to C line; nF is refractive index to F line; and ng is an index of refraction to g line.

If it is less than the lower limit of the condition (7), in case that a thin type optical system is made to have a large aperture ratio, chromatic aberration by a secondary spectrum, that is, chromatic aberration correction of g line when achromatism is carried out by F line and C line cannot be fully achieved. Therefore, when a photographic subject is photographed by the optical system, it is hard to secure sharpness in a photographed picture of the subject. On the other hand, if it exceeds the maximum value of the condition (7), in case that a thin shape type optical system is made to have a large aperture ratio, it becomes superfluous correction of a secondary spectrum. Therefore, as same as the case that it is less than the lower limit of condition (7), it is difficult to secure sharpness in a photographed picture of the subject.

If it is less than the lower limit of the condition (8), or if it exceeds the upper limit of condition (8), in case that a thin shape type optical system is made to have a large aperture ratio, achromatism by F line and C line becomes difficult and the chromatic aberration changes at the time of zooming becomes large. Therefore, when a photographic subject is photographed by the optical system, it is hard to secure sharpness in a photographed picture of the subject.

It is desired to satisfy the following condition (7') instead of the condition (7).

$$0.6800 < \beta p < 0.8700 \quad (7')$$

It is much more desired that the following condition (7") is satisfied instead of the condition (7).

$$0.6900 < \beta p < 0.8200 \quad (7'')$$

In a rectangular coordinate system in which a horizontal axis is expressed by vdp and an vertical axis is expressed by θhgp, when a straight line expressed by θhgp=αhgp×vdp+βhgp(here, αhgp=−0.00225) is set up, it is desired that vdp and θgFp of positive lens $L_{AP}$ are made to be included in both of a domain which is specified by a straight line at a lower limit of the following condition (8) and by a straight line at the maximum value of the condition (9), and a domain which is specified by the following condition (9).

$$0.5700 < \beta hgp < 0.9500 \quad (9)$$

$$3 < vdp < 27 \quad (8)$$

here, $\theta_{hgp}$ is a ratio of a partial dispersion (nh−ng)/(nF−nC) of the positive lens $L_{AP}$; vdp is Abbe number (nd−1)/(nF−nC) of the positive lens $L_{AP}$; nd is refractive index to d line; nC is refractive index to C line; nF is refractive index to F line; ng is refractive index to g line; and nh is an index of refraction to h line.

If it is less than the lower limit of condition (5), in case that a thin type optical system is made to have a large aperture ratio, chromatic aberration by a secondary spectrum, that is, chromatic aberration correction of h line when achromatism is carried out by F line and C line cannot be fully performed. Therefore, when a photographic subject is photographed by the optical system, in a pictorial image of photographic subject, it is easy to generate a purple color flare and a color blot. On the other hand, if it exceeds the maximum value of the condition (9), in case that a thin type optical system is made to have a large aperture ratio, chromatic aberration by a secondary spectrum, that is, chromatic aberration correction by h line when achromatism is carried out by F line and C line becomes superfluous. Therefore, when a photographic subject is photographed by the optical system, in a pictorial image of photographic subject, t is easy to generate a purple color flare and a color blot.

It is desirable to satisfy the following condition (9') instead of the condition (9).

$$0.6200 < \beta hgp < 0.9200 \quad (9')$$

Furthermore, it is much more desired that the following condition (9") is satisfied instead of the condition (9).

$$0.6500 < \beta hgp < 0.8700 \quad (9")$$

In the zoom optical system of the present invention, if the condition (10) is satisfied, in case that a thin type optical system is made to have a large aperture ratio a correction effect to a secondary spectrum becomes large. Therefore, in a pictorial image of photographic subject, sharpness effect increases.

$$0.08 \leq \theta gFp - \theta gFn \leq 0.50 \quad (10)$$

here, $\theta gFp$ is a ratio of a partial dispersion $(ng-nF)/(nF-nC)$ of the positive lens $L_{AP}$; $\theta gFn$ is a ratio of a partial dispersion $(ng-nF)/(nF-nC)$ of the negative lens $L_{AN}$; nC is refractive index to C line; nF is refractive index to F line; and ng is an index of refraction to g line.

It is much desired that the following condition (10') is satisfied instead of the condition (10).

$$0.10 \leq \theta gFp - \theta gFn \leq 0.40 \quad (10')$$

It is the best if the following condition (10") is satisfied instead of the condition (10).

$$0.12 \leq \theta gFp - \theta gFn \leq 0.30 \quad (10")$$

In the zoom optical system according to the present invention, it is desired that the following condition (11) is satisfied. In this case, in a pictorial image of photographic subject, color flare and a color blot can be mitigated.

$$0.09 \leq \theta hgp - \theta hgn \leq 0.60 \quad (11)$$

here, $\theta h$ is a ratio of a partial dispersion $(nh-ng)/(nF-nC)$ of the positive lens $L_{AP}$; $\theta hgn$ is a ratio of a partial dispersion $(nh-ng)/(nF-nC)$ of the negative lens $L_{AN}$; nC is refractive index to C line; nF is refractive index to F line; ng is refractive index to g line; and nh is an index of refraction to h line.

It is much desired that the following condition (11') is satisfied instead of the condition (11).

$$0.12 \leq \theta hgp - \theta hgn \leq 0.50 \quad (11')$$

It is the best if the following condition (11") is satisfied instead of the condition (11).

$$0.15 \leq \theta hgp - \theta hgn \leq 0.40 \quad (11")$$

In the zoom optical system of the present invention, it is easy to carry out achromatism of C line and F line of axial chromatic aberration and chromatic aberration of magnification if the following condition (12) is satisfied.

$$vdp - vdn \leq -30 \quad (12)$$

here, vdp is Abbe number $(nd-1)/(nF-nC)$ of the positive lens $L_{AP}$; vdn is Abbe number $(nd-1)/(nF-nC)$ of the negative lens $L_{AN}$; nd is refractive index to d line; nC is refractive index to C line; and nF is an index of refraction to F line.

It is much desired that the following condition (12') is satisfied instead of the condition (12).

$$vdp - vdn \leq -40 \quad (12')$$

It is the best if the following condition (12") is satisfied instead of the condition (10).

$$vdp - vdn \leq -50 \quad (12")$$

By the way, in the zoom optical system of the present invention, the lens groups A, C, and D are constituted with the minimum unit (that is, each of them is constituted with one lens component). This has contributed greatly to thinning of an optical system. In order to realize more thinning of the optical system, thinning of the lens group B is indispensable. Here, the lens group B is a lens group which becomes most easily thick when a large aperture ratio is achieved. The best method of making it thin is making curvature of each surface of lenses large. For this purpose, it is effective to constitute such that $_{AVE}nd_{2P}$ that is an average of refractive indexes (refractive indexes to d line) of all positive lenses in the lens group B is made large as much as possible, and $_{AVE}vd_{2N}$ that is an average value of Abbe number (Abbe number in d line) of a negative lens is made small as much as possible (namely, to use an appropriate optical material for them). Concretely, it is desirable to satisfy the following conditions (13) and (14). If these conditions are satisfied, thinning of the lens group B can be realized. Moreover, aspherical aberration and astigmatism can be corrected well.

$$1.77 \leq {}_{AVE}nd_{2P} \quad (13)$$

$$vd_{2N} \leq 27 \quad (14)$$

As mentioned above, if it exceeds the lower limit of condition (13) or the maximum value of condition (13), a thickness of the lens group B will become large. It is much desired that the following conditions (13') and (14') are satisfied instead of the conditions (13) and (14).

$$1.79 \leq {}_{AVE}nd_{2P} \quad (13')$$

$$vd_{2N} \leq 25 \quad (14')$$

It is the best if the following conditions (13") and (14") are satisfied instead of the conditions (13) and (14).

$$1.81 \leq {}_{AVE}nd_{2P} \quad (13")$$

$$vd_{2N} \leq 23 \quad (14")$$

Next, explanation will be made about the lens group D. If the lens group A is constituted with one lens component for thinning as mentioned above, it is disadvantageous in respect of correction of astigmatism. Accordingly, it is desired that a surface directed toward the object side in the lens group D is made an aspherical surface, and a surface directed toward the image side is made a form having strong curvature. Or, it is desired that the lens groups C has a double concave form. It is good that a surface directed toward the object side of the lens group C is made an aspherical surface. Moreover, it is desirable to use an optical material having high refractive index and low distribution nature as much as possible also about the lens group D. Concretely, it is desired that the lens group D satisfies the following conditions (15) and (16).

$$1.77 \leq nd_{4P} \quad (15)$$

$$34 \leq vd_{4P} \quad (16)$$

here, $nd_{4P}$ is refractive index of the lens group D to d line; and vd4P is Abbe number of the lens group D to d line.

If it is less than the lower limits of the conditions (15) and (16), it becomes disadvantageous for correction of astigmatism and chromatic aberration.

It is more desirable to satisfy the following conditions (15') and (16') instead of the conditions (15) and (16).

$$1.79 \leq nd_{4P} \quad (15')$$

$$37 \leq vd_{4P} \quad (16')$$

It is the best if the following conditions (15") and (16") are satisfied instead of the conditions (15) and (16).

$$1.81 \leq nd_{4P} \quad (15'')$$

$$40 \leq vd_{4P} \quad (16'')$$

Here, it is desired that the lens group C and the lens group D are moved while expanding simply a relative distance between them while magnification from the wide angle end to the telephoto end is carried out. Or, it is desired that both of the lens group C and the lens group D are moved so that the lens group D may approach an image forming point. By this way, variation of astigmatism at the wide angle end and variation of the astigmatism at the wide angle end can be suppressed. Moreover, it is good if the following condition (17) is satisfied when $d_{CD}$ represents a distance between the lens group C and the lens group D on the optical axis when focusing is carried out at the infinite object point at the wide angle end $$0.2 \leq d_{CD}/fw \leq 1.2 \quad (17)$$

here, fw is a focal length of the whole zoom optical system when focusing is carried out at the infinite object point at the wide angle end.

If it is less than the lower limit of the condition (17), it becomes difficult to correct well astigmatism throughout whole zooming range when a thin type optical system is made to have a large aperture ratio. Or, it becomes difficult to make a degree of sensitivity to eccentricity low in each of the lens-group C and the lens-group D. On the other hand, if it exceeds the upper limit of the condition (17), it will become difficult to make thin a lens holding barrel of a collapsible type camera body. It is much desired that the following condition (17') in which the condition is much restricted is satisfied instead of the condition (17).

$$0.25 < d_{CD}/fw \leq 0.9 \quad (17')$$

It is the best if the following condition (17") which is much more restricted condition is satisfied instead of the condition (17).

$$0.3 \leq d_{CD}/fw \leq 0.6 \quad (17'')$$

It is desired that the lens group C and the lens group D are moved changing a mutual distance between them while focusing is carried out also from a distant object point to a near object point as well as in case while magnification is carried out. By this way, variation of astigmatism when focusing is carried out can be suppressed. Especially, it is good that the lens group C and the lens group D are moved together while the relative distance between both lens groups is narrowed simply.

Next, an auxiliary means for carrying out correction of astigmatism more effectively will be explained. When the lens group A is constituted by only one lens component as shown in the present invention, a relation between correction of astigmatism and correction of barrel type distortion becomes easily trade-off relation. So, this point is noted in the present invention, and it is constituted such that by permitting to some extent generation of distortion, and as an auxiliary means, an image distortion is corrected by an image-processing function included in an electronic imaging apparatus.

Here, correction of distortion by image processing will be explained in detail.

It is assumed that image forming of an object at the infinite distance is carried out by an optical system which does not have distortion. In this case, since there is no distortion in the image where image forming is carried out, the following condition (18) can be formed.

$$f = y/\tan \omega \quad (18)$$

here, y is a height from the optical axis of an image point, f is a focal length of an imaging forming system, ω is an angle to the optical axis in the direction of an object point corresponding to an image point connecting to the position of y from the center on an imaging surface.

On the other hand, in an optical system when barrel-type distortion is permitted only in the state near the wide angle end, the following condition (19) is formed.

$$f > y/\tan \omega \quad (19)$$

That is to say, if ω and y are set a constant value, a focal length at the wide angle end can be long, accordingly correction of aberration becomes easily by such length.

In general, a lens group corresponding to the lens group A is constituted with two or more components. The reason of the constitution is for coexisting of correction of distortion and correction of astigmatism.

Contrary to this, in the zoom optical system of the present invention, generating of distortion is permitted to some extent. Namely, since it is not necessary to carry out correction of distortion and correction of astigmatism consistently, thinning of the zoom optical system can be achieved by using one lens component. Accordingly, in the imaging apparatus provided with the zoom optical system according to the present invention, an image data obtained by an electronic imaging element is processed by image processing. In this processing, the image data (shape of a picture image) is changed so that distortion of barrel type may be corrected. By such constitution mentioned above, an image data finally obtained is an image data having almost similar figure of an object. Therefore, it is good enough to output the picture image of the object to CRT or a printer by using this image data.

Here, it is desirable to adopt a zoom optical system to satisfy the following condition (19) when focusing is carried out at almost nearly infinite object point, $$0.7 < y_{07}/(fw \cdot \tan \omega_{07w}) < 0.94 \quad (20)$$

here, $y_{07}$ is expressed by $y_{07} = 0.7 y_{10}$ when a distance to the most distant point from a center (maximum image height) within an effective imaging surface of the electronic imaging element (within the surface in which photographing can be performed) is set to $y_{10}$; $\omega_{07w}$ is an angle to the optical axis of the direction of an object point corresponding to an image point connected to the position of $y_{07}$ from the center on the imaging surface at a wide angle end; and fw is a focal length of the whole zoom optical system at the wide angle end.

The condition (20) specifies an amount of barrel-type distortion at the wide angle end in zooming. If the condition (20) is satisfied, a reasonable correction of astigmatism can be attained. An image which is distorted in barrel shape is converted photo-electrically by an imaging element, and it becomes an image data of distorted barrel shape. However, the image data distorted to barrel shape, processing corresponding to change of an image shape is carried out electrically by an image processing means which is a signal-processing system of an electronic imaging apparatus. By such constitution mentioned above, even if the image data finally outputted from the image processing means is reproduced on a display device, an image having almost similar to a shape of photographic subject in which distortion is corrected can be obtained.

Here, when it exceeds an upper limit of the condition (20), especially, if the value is near 1, distortion is corrected well optically. However, on the one hand, it is not desirable since correction of astigmatism becomes difficult. On the other hand, if it is less than a lower limit of the condition (19), a ratio of enlargement toward radial directions at a peripheral portion of an image becomes high too much when an image distortion owing to distortion of an optical system is corrected by the image processing means. As a result, degradation of the sharpness at the peripheral portion of the image becomes conspicuous.

It becomes easy to correct astigmatism well by satisfying the condition (19), and accordingly thinning and large aperture ratio (for example, brighter than F/2.8 at a wide angle end) of a zoom optical system can be coexistent. It is more desired that the following condition (20') is satisfied instead of the condition (20).

$$0.75 < y_{07}/(fw\text{-tan }\omega_{07w}) < 0.93 \quad (20')$$

Furthermore, it is much more desired that the following condition (20") is satisfied instead of the condition (20).

$$0.80 < y_{07}/(fw\text{-tan }\omega_{07w}) < 0.92 \quad (20")$$

According to the zoom optical system of the present invention, even if an imaging element having high pixel number is used, good correction of aberration which can bear it enough is realizable by providing with (or satisfying) each of the conditions and constitutional features described above. Therefore, coexistence of large aperture ratio and thinning of a zoom optical system can be attained. The zoom optical system according to the present invention can be constituted with combining (satisfying) the conditions and features mentioned above. In this case, while a good correction of aberration is attained, much smaller thinning of the optical system and large aperture ratio can be attained. According to the imaging apparatus provided with the zoom optical system of the present invention, high performance and miniaturization can be achieved by using a zoom optical system in which small size, thinning of an optical system and large aperture ratio are compatible.

Hereafter, embodiments of the present invention will be explained using drawings. The zoom optical system of the present embodiment consists of four lens groups. In these lens groups, a first lens group consists of two lenses (two-sheet cemented lens), a second lens group consists of three lenses (a single lens, and two-sheet cemented lens), a third lens group consists of one lens, and a fourth lens group also consists of one lens. The second lens group can be constituted with four lenses (a single lens and three-sheet cemented lens).

The refracting power of one lens can also be made to share with two lenses. In this case, although not shown in the embodiment, one lens can be increased at least in the one lens group of the four lens groups. In case of the maximum, the first lens group is constituted with three lenses, the second lens group is constituted with four or five lenses, the third lens group is constituted with two lenses, and the fourth group is also constituted with two lenses. Here, the two lenses can be a cemented lens, or can be a single lens in which each of lenses is separated. (for example, the first lens group can constituted with two-sheet cemented lens and a single lens, or a three-sheet cemented lens).

Thus, the zoom optical system can be constituted such that the first lens group consists of 2~3 lenses, the second lens group consists of 3~5 lenses, the third lens group consists of 1~2 lenses. They are 1~2 lenses about the fourth lens group, since the number of sheet of the lens which can be used for aberration correction increases by increasing one sheet of lens, large aperture size can be obtained in a state where aberration is corrected well. Moreover, the thickness of a lens does not increase so much since each radius of curvature of two lenses can be enlarged. Therefore, the optical system does not become large size.

Embodiment 1

Figure 1B:
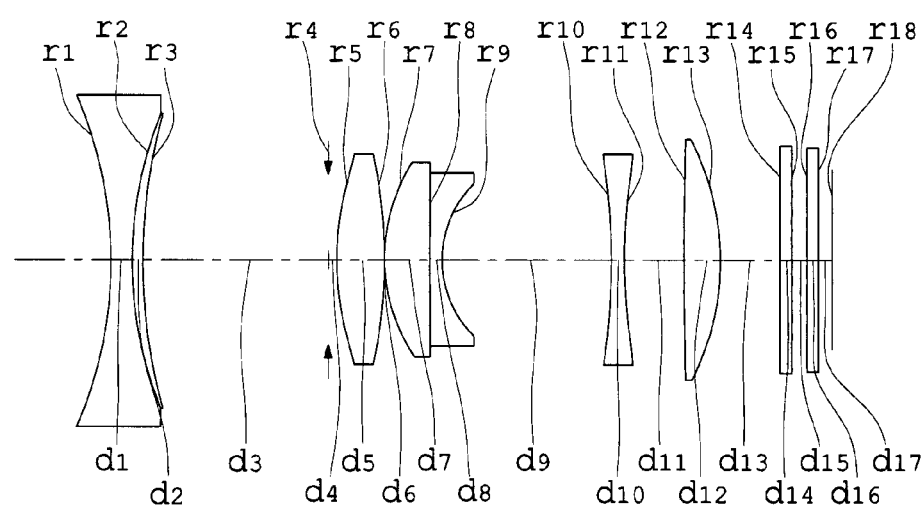
Figure 1C:
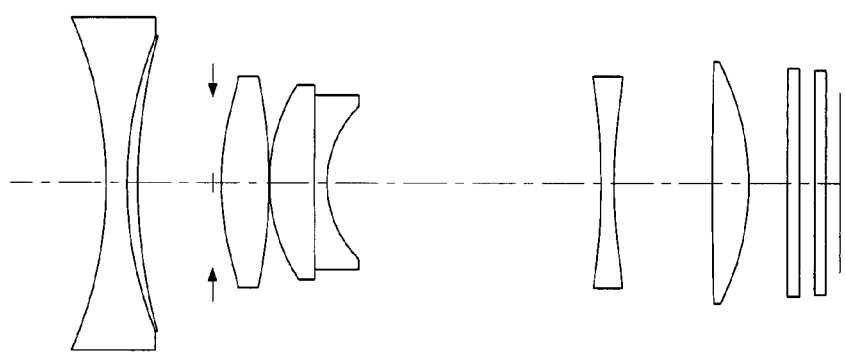

FIGS. 1A, 1B and 1C are sectional views showing an optical arrangement developed along an optical axis at a wide angle end, a middle position and a telephoto end, respectively, of the zoom lens system when focusing is carried out at the infinite object point in the first embodiment according to the present invention. FIGS. 2A-2D, 2E-2H, and 2I-2 are figures showing spherical aberration, astigmatism, distortion, and chromatic aberration of magnification, respectively, when focusing is carried out at the infinite object point of the zoom optical system of FIG. 1, and show states in the wide angle end, the middle position, and the telephoto end, respectively.

In FIG. 1, I is an imaging surface of CCD which is an electronic imaging element, S is an aperture stop, FL is a filter having a form like parallel plate, and CG is a CCD cover glass having a form like plane plate. The zoom optical system of the embodiment 1 is constituted by having a lens group, filter FL, cover glass CG and CCD (it is not necessary that CCD is contained in parts constituting a zoom optical system. This is the same in other embodiments). The zoom optical system comprises, in order from an object side, a first lens group G1 as lens group A, an aperture stop S, a second lens group G2 as lens group B, a third lens group G3 as lens group C, and a fourth lens group G4 as lens group D.

The first lens group G1 consists of a cemented lens in which a double concave lens L11 and a positive meniscus lens L12 having a convex surface directed toward the object side (namely, a concave surface toward the image side) are cemented lens, and, it has negative refracting power as a whole. As for this cemented lens, each of surfaces contacted with air is an aspherical surface.

The positive meniscus lens L12 having a convex surface directed toward the object side is a lens in which an energy hardening type resin is used, and it is formed on the double concave lens L11. The second lens group G2 consists of a double convex lens L21, and a cemented lens in which a double convex lens L22 and a double concave lens L23 are cemented, and it has positive refracting power as a whole. The third lens group G3 consists of a double concave lens L31. The double concave lens L31 has an aspherical surface at object side. The fourth lens group G4 consists of a double convex lens L41. The double convex lens L41 has an aspherical surface at the object side.

When magnification from a wide angle end to a telephoto end is carried out, the first lens group G1 moves to two directions along the optical axis, namely, it moves toward the image side at first, and then toward the object side, and the second lens group G2 and an aperture stop S move together simply along the optical axis toward the object side so that a distance to the first lens group G1 may be narrowed. The third lens group G3 moves to two directions along the optical axis, namely, it moves toward the image side at first, and then it moves so as to narrow a distance to the lens group G4, and then it moves toward the object side, and the fourth lens group G4 moves simply toward the image side along the optical axis.

When focusing is carried out, the third lens group G3 and the fourth lens group G4 are moved together while changing a relative distance between them. The distance between the third lens group G3 and the fourth lens group G4 is narrowed when the third lens group and the fourth lens group are moved in order to carry out focusing at a nearer object point as much as possible at a state that the first lens group G1 and the second lens group G2 are stopped moving.

Numerical data of the zoom optical system of the embodiment 1 are shown below.

Here, $r_1, r_2 \ldots$ represent a radius of curvature of each lens surface; $d_1, d_2 \ldots$ represent a distance between each lens surface; $n_{d1}, nd_2 \ldots$ represent a refracting index of each lens at d ray; $v_{d1}, v_{d2} \ldots$ is Abbe number of each lens at d ray; F is a focal distance of the whole zoom optical system; and fno is an F number.

An aspherical surface is expressed by the following formula (13), where a direction of an optical axis is z; a direction which intersects perpendicularly to the optical axis is h; a cone coefficient is k; an aspherical coefficient is represented by $A_4, A_6, A_8,$ and $A_{10}$; and a radius of curvature of spherical surface component on the optical axis is R.

$$z = \frac{h^2}{R\left[1 + \left\{1 - (1+k)\frac{h^2}{R^2}\right\}^{\frac{1}{2}}\right]} + A_4 h^4 + A_6 h^6 + A_8 h^8 + A_{10} h^{10} + \quad (13)$$

Furthermore, in the numerical data, (AP) represents an aspherical surface; (AS) represents an aperture stop; and (IM) represents a light receiving surface of an imaging element.

These symbols are common in the numerical data of embodiments to be described later.

Numerical data 1

| | | | |
|---|---|---|---|
| $r_1 = -13.2566$ (AP) | $d_1 = 0.8000$ | $n_{d1} = 1.49700$ | $v_{d1} = 81.54$ |
| $r_2 = 13.1877$ | $d_2 = 0.4237$ | $n_{d2} = 1.63494$ | $v_{d2} = 23.22$ |
| $r_3 = 20.8972$ (AP) | $d_3 = D3$ | | |
| $r_4 = \infty$ (AS) | $d_4 = 0.3000$ | | |
| $r_5 = 8.6234$ (AP) | $d_5 = 1.8201$ | $n_{d5} = 1.83481$ | $v_{d5} = 42.71$ |
| $r_6 = -28.1231$ (AP) | $d_6 = 0.0791$ | | |
| $r_7 = 7.0624$ (AP) | $d_7 = 1.7619$ | $n_{d7} = 1.83481$ | $v_{d7} = 42.71$ |
| $r_8 = -462.1726$ | $d_8 = 0.4000$ | $n_{d8} = 1.80810$ | $v_{d8} = 22.76$ |
| $r_9 = 3.9333$ | $d_9 = D9$ | | |
| $r_{10} = -34.2928$ (AP) | $d_{10} = 0.5000$ | $n_{d10} = 1.52542$ | $v_{d10} = 55.78$ |
| $r_{11} = 22.6658$ | $d_{11} = D11$ | | |
| $r_{12} = 63.7715$ (AP) | $d_{12} = 1.3800$ | $n_{d12} = 1.83481$ | $v_{d12} = 42.71$ |
| $r_{13} = -9.6000$ | $d_{13} = D13$ | | |
| $r_{14} = \infty$ | $d_{14} = 0.5000$ | $n_{d14} = 1.54771$ | $v_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $v_{d16} = 64.14$ |
| $r_{17} = \infty$ | $d_{17} = D17$ | | |
| $r_{18} = \infty$ (IM) | | | |

Aspherical coefficient

Surface number 1 k = −2.8817
$A_2 = 0$   $A_4 = 0$   $A_6 = 3.6881 \times 10^{-6}$
$A_8 = -5.5124 \times 10^{-8}$   $A_{10} = 0$
Surface number 3 k = −2.9323
$A_2 = 0$   $A_4 = 3.6856 \times 10^{-5}$   $A_6 = 5.0066 \times 10^{-6}$
$A_8 = -5.9251 \times 10^{-8}$   $A_{10} = 0$
Surface number 5 k = −1.8270
$A_2 = 0$   $A_4 = -3.4535 \times 10^{-4}$   $A_6 = -2.1823 \times 10^{-5}$
$A_8 = -7.8527 \times 10^{-8}$   $A_{10} = 0$ -continued Surface number 6 k = −5.3587
$A_2 = 0$   $A_4 = -3.7600 \times 10^{-4}$   $A_6 = -4.8554 \times 10^{-6}$
$A_8 = -2.1415 \times 10^{-7}$   $A_{10} = 0$
Surface number 7 k = 0.1274
$A_2 = 0$   $A_4 = 8.3040 \times 10^{-5}$   $A_6 = 1.9928 \times 10^{-5}$
$A_8 = 5.0707 \times 10^{-7}$   $A_{10} = 8.1677 \times 10^{-9}$
Surface number 10 k = 57.7596
$A_2 = 0$   $A_4 = -1.7412 \times 10^{-4}$   $A_6 = -4.6146 \times 10^{-6}$
$A_8 = 1.1872 \times 10^{-6}$   $A_{10} = 0$
Surface number 12 k = 0
$A_2 = 0$   $A_4 = -4.1049 \times 10^{-4}$   $A_6 = 3.1634 \times 10^{-6}$
$A_8 = 0$   $A_{10} = 0$ Refractive index of component of the negative lens $L_{AN}$ according to wavelength nd = 1.496999  nC = 1.495136  nF = 1.501231  ng = 1.504506
nh = 1.507205

Refractive index of component of the positive lens $L_{AP}$ according to wavelength nd = 1.634940  nC = 1.627290  nF = 1.654640  ng = 1.672908
nh = 1.689873

Zoom data (D0 (distance from an object to the first surface) is infinity)

| | wide angle end | middle position | telephoto end |
|---|---|---|---|
| F | 6.42001 | 11.01031 | 18.48960 |
| f no | 1.8604 | 2.4534 | 3.4040 |
| D0 | ∞ | ∞ | ∞ |
| D3 | 14.77955 | 7.26463 | 2.92947 |
| D9 | 2.20000 | 6.46215 | 10.54460 |
| D11 | 2.38783 | 2.27230 | 3.76136 |
| D13 | 3.16783 | 2.30230 | 1.60000 |
| D17 | 0.50014 | 0.50001 | 0.49987 |

Embodiment 2

Figure 3A:
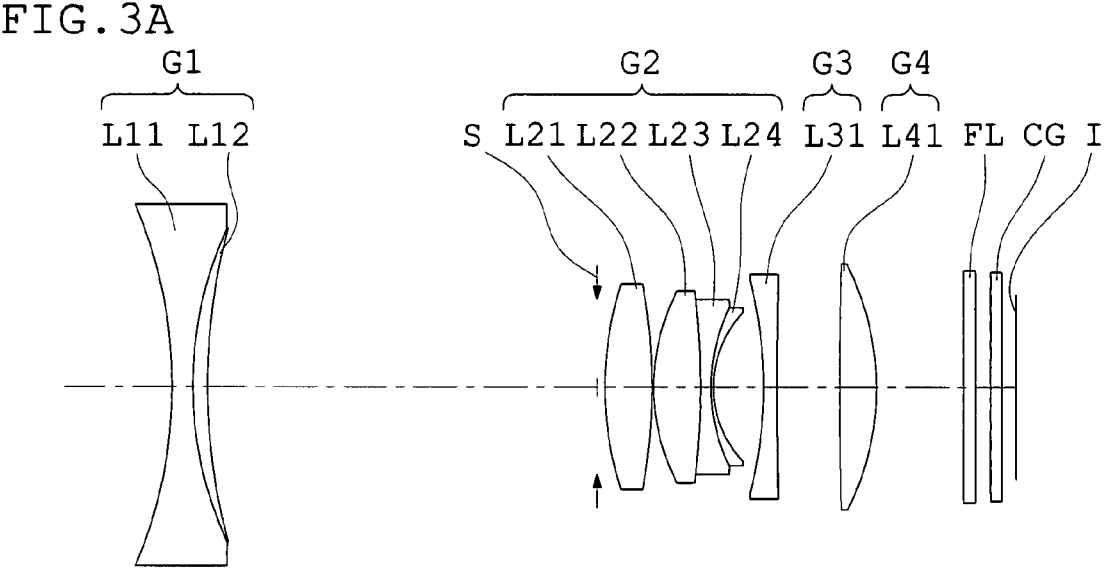
FIGS. 3A, 3B and 3C are sectional views showing an optical arrangement developed along an optical axis at a wide angle end, a middle position and a telephoto end respectively of the zoom lens system when focusing is carried out at the infinite object point in an embodiment 2 according to the present invention.
Figure 3B:
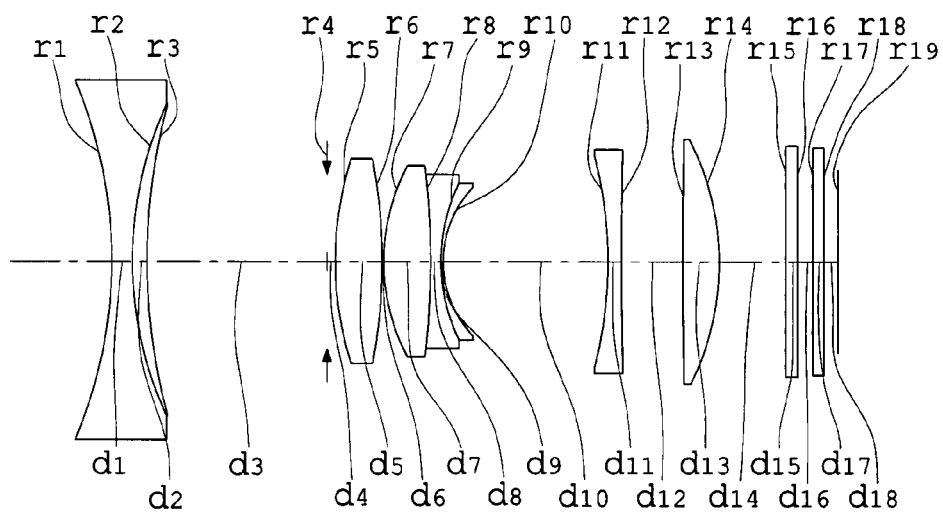
Figure 3C:
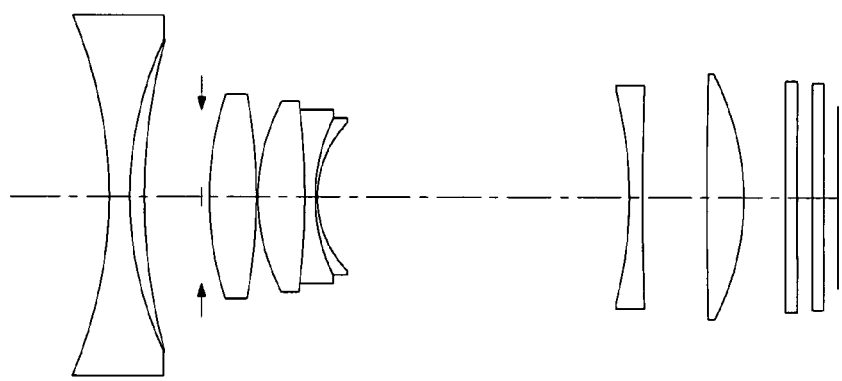

FIGS. 3A, 3B and 3C are sectional views showing an optical arrangement developed along an optical axis at a wide angle end, a middle position and a telephoto end respectively of the zoom lens system when focusing is carried out at the infinite object point in an embodiment 2 according to the present invention. FIGS. 4A~4D, 4E~4H, and 4I~4L are figures showing spherical aberration, astigmatism, distortion, and chromatic aberration of magnification respectively, when focusing is carried out at the infinite object point of the zoom optical system of FIG. 3, and show states in the wide angle end, the middle position, and the telephoto end, respectively.

In FIG. 3, I is an imaging surface of CCD which is an electronic imaging element, S is an aperture stop, FL is a filter having a form like parallel plate, and CG is a CCD cover glass having a form like plane plate. The zoom optical system of the embodiment 2 is constituted by having a lens group, filter FL, cover glass CG and CCD.

The zoom optical system of the embodiment 2 is constituted by having a lens group, filter FL, cover glass CG and CCD. The zoom optical system comprises, in order from an object side, a first lens group G1 as lens group A, an aperture stop S, a second lens group G2 as lens group B, a third lens group G3 as lens group C, and a fourth lens group G4 as lens group D.

The first lens group G1 comprises a cemented lens in which a double concave lens L11 and a positive meniscus lens L12 having a convex surface directed toward the object side (namely, a concave surface directed toward the image side) are cemented, and it has negative refracting power as a whole. As for the cemented lens, each of air contacted surfaces is an aspherical surface.

The positive meniscus lens L12 having concave surface directed toward the object side is a lens which the an energy hardening type resin is used, and it is formed on the double concave lens L11. The second lens group G2 consists of a double convex lens L21, and a cemented lens in which a double convex lens L22, a double concave lens L23, and a negative meniscus lens 24 having a convex surface directed toward the object side are cemented, and it has positive refracting power as a whole. The third lens group G3 consists of a double concave lens L31. The double concave lens L31 has an aspherical surface directed toward the object side. The fourth lens group G4 consists of a double convex lens L41 having an aspherical surface directed toward the object side.

When magnification from a wide angle end to a telephoto end is carried out, the first lens group G1 moves to two directions along the optical axis, namely, it moves toward an image side at first, and then toward an object side, and the second lens group G2 and an aperture stop S move together simply along the optical axis toward the object side so that a distance to the first lens group G1 may be narrowed. The third lens group G3 moves simply toward the image side along the optical axis, and the fourth lens group G4 moves toward the image side along the optical axis so that a distance to the third lens group G3 may be kept constant. The third lens group G3 and the fourth lens group G4 move together, changing a relative distance between them when focusing is carried out. The distance between the third lens group G3 and the fourth lens group G4 is narrowed when the third lens group G3 and the fourth lens group G4 are moved in order to carry out focusing at a nearer object point as much as possible in a state that the first lens group G1 and the second lens group G2 are stopped moving.

Numerical data of the zoom optical system of the second embodiment are shown below.

Numerical data 2

| | | | |
|---|---|---|---|
| $r_1 = -12.3442$ (AP) | $d_1 = 0.8000$ | $n_{d1} = 1.49700$ | $v_{d1} = 81.54$ |
| $r_2 = 13.4553$ | $d_2 = 0.5314$ | $n_{d2} = 1.63494$ | $v_{d2} = 23.22$ |
| $r_3 = 28.5230$ (AP) | $d_3 = D3$ | | |
| $r_4 = \infty$ (As) | $d_4 = 0.3000$ | | |
| $r_5 = 9.0189$ (AP) | $d_5 = 1.7947$ | $n_{d5} = 1.77377$ | $v_{d5} = 47.18$ |
| $r_6 = -17.3973$ (AP) | $d_6 = 0.0791$ | | |
| $r_7 = 7.2281$ | $d_7 = 1.7188$ | $n_{d7} = 1.81600$ | $v_{d7} = 46.62$ |
| $r_8 = -40.0282$ | $d_8 = 0.4000$ | $n_{d8} = 1.76182$ | $v_{d8} = 26.52$ |
| $r_9 = 5.8000$ | $d_9 = 0.1000$ | $n_{d9} = 1.63494$ | $v_{d9} = 23.22$ |
| $r_{10} = 3.3167$ (AP) | $d_{10} = D10$ | | |
| $r_{11} = -17.7768$ (AP) | $d_{11} = 0.5000$ | $n_{d11} = 1.49700$ | $v_{d11} = 81.54$ |
| $r_{12} = 390.0428$ | $d_{12} = D12$ | | |
| $r_{13} = 75.0584$ (AP) | $d_{13} = 1.3500$ | $n_{d13} = 1.83481$ | $v_{d13} = 42.71$ |
| $r_{14} = -9.4000$ | $d_{14} = D14$ | | |
| $r_{15} = \infty$ | $d_{15} = 0.5000$ | $n_{d15} = 1.54771$ | $v_{d15} = 62.84$ |
| $r_{16} = \infty$ | $d_{16} = 0.5000$ | | |
| $r_{17} = \infty$ | $d_{17} = 0.5000$ | $n_{d17} = 1.51633$ | $v_{d17} = 64.14$ |
| $r_{18} = \infty$ | $d_{18} = D18$ | | |
| $r_{19} = \infty$ (IM) | | | |

Aspherical coefficient

Surface number 1

$k = -6.7681$
$A_2 = 0$ $A_4 = 0$ $A_6 = 1.0812 \times 10^{-6}$
$A_8 = -1.3937 \times 10^{-8}$ $A_{10} = 0$ Surface number 3

$k = -7.1823$
$A_2 = 0$ $A_4 = 2.5037 \times 10^{-4}$ $A_6 = 4.0271 \times 10^{-7}$
$A_8 = -1.3487 \times 10^{-8}$ $A_{10} = 0$ Surface number 5

$k = -1.0055$
$A_2 = 0$ $A_4 = -2.1413 \times 10^{-4}$ $A_6 = 0$
$A_8 = 0$ $A_{10} = 0$ Surface number 6

$k = -43.9099$
$A_2 = 0$ $A_4 = -1.2952 \times 10^{-4}$ $A_6 = 0$
$A_8 = 0$ $A_{10} = 0$ Surface number 10

$k = 0$
$A_2 = 0$ $A_4 = -3.6910 \times 10^{-3}$ $A_6 = 8.6183 \times 10^{-5}$
$A_8 = -2.7146 \times 10^{-5}$ $A_{10} = 0$ Surface number 11

$k = 0$
$A_2 = 0$ $A_4 = -4.8312 \times 10^{-4}$ $A_6 = 1.1957 \times 10^{-5}$
$A_8 = 0$ $A_{10} = 0$ Surface number 13

$k = 0$
$A_2 = 0$ $A_4 = -3.7266 \times 10^{-4}$ $A_6 = 0$
$A_8 = 0$ $A_{10} = 0$ Refractive index of component of the negative lens $L_{AN}$ according to wavelength nd = 1.496999 nC = 1.495136 nF = 1.501231 ng = 1.504506
nh = 1.507205

Refractive index of component of the positive lens $L_{AP}$ according to wavelength nd = 1.634940 nC = 1.627290 nF = 1.654640 ng = 1.672908
nh = 1.689873

Zoom data (D0 (distance from an object to the first surface) is infinity)

| | wide angle end | middle position | telephoto end |
|---|---|---|---|
| F | 6.42000 | 11.01025 | 18.48952 |
| fno | 1.8778 | 2.4831 | 3.4338 |
| D0 | ∞ | ∞ | ∞ |
| D3 | 14.88305 | 6.97580 | 2.28964 |
| D10 | 1.89485 | 6.19550 | 11.88154 |
| D12 | 2.38679 | 2.38679 | 2.38679 |
| D14 | 3.26126 | 2.53410 | 1.60000 |
| D18 | 0.50009 | 0.49998 | 0.49965 |

Embodiment 3

Figure 5A:
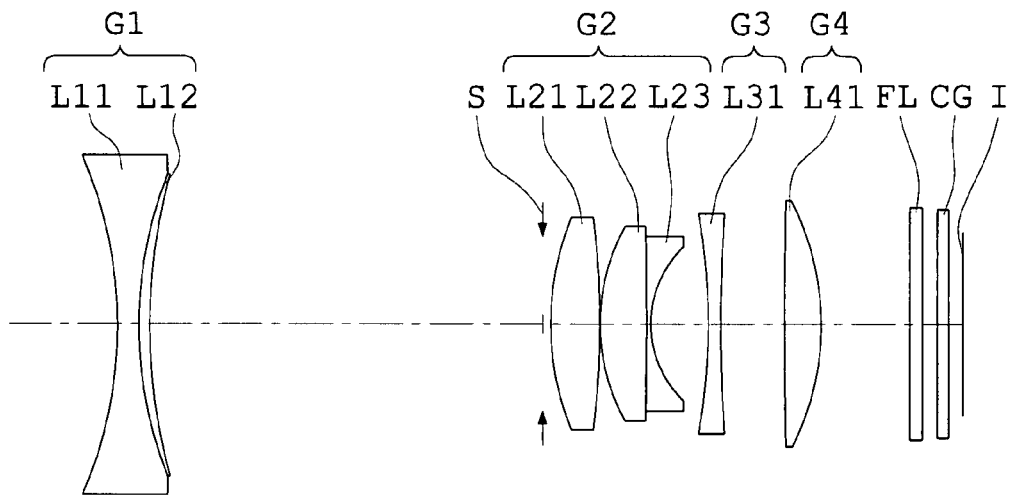
FIGS. 5A, 5B and 5C are sectional views showing an optical arrangement developed along an optical axis at a wide angle end, a middle position and a telephoto end respectively of the zoom lens system when focusing is carried out at the infinite object point in an embodiment 3 according to the present invention.
Figure 5B:
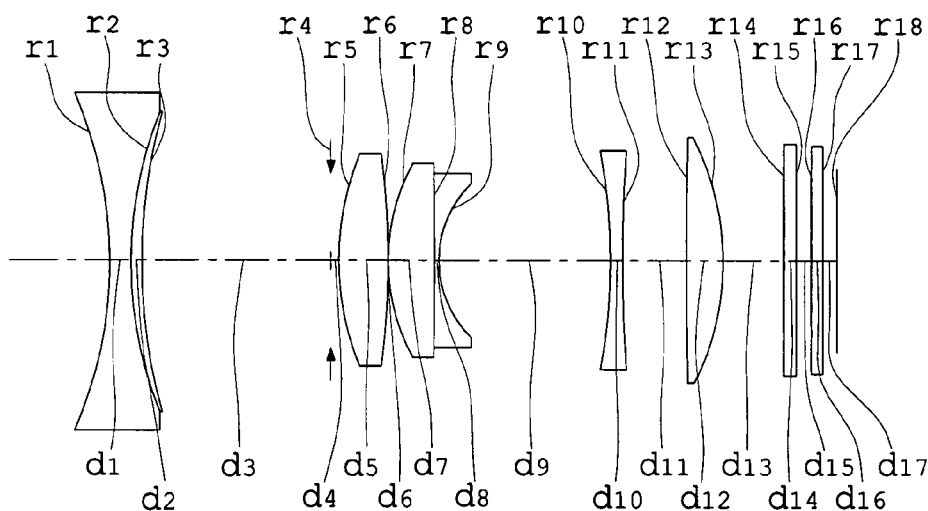
Figure 5C:
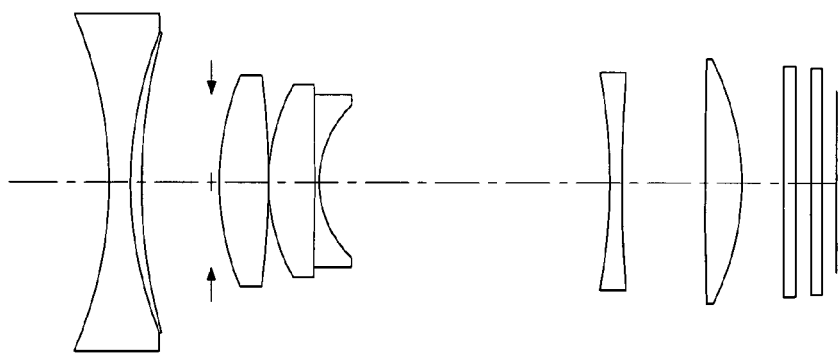

FIGS. 5A, 5B and 5C are sectional views showing an optical arrangement developed along an optical axis at a wide angle end, a middle position and a telephoto end respectively of the zoom lens system when focusing is carried out at the infinite object point in an embodiment 3 according to the present invention. FIGS. 6A~6D, 6E~6H, and 6I~6L are figures showing spherical aberration, astigmatism, distortion, and chromatic aberration of magnification respectively, when focusing is carried out at the infinite object point of the zoom optical system of FIG. 5, and show states in the wide angle end, the middle position, and the telephoto end, respectively. In FIG. 5, I is an imaging surface of CCD which is an electronic imaging element, S is an aperture stop, FL is a filter having a form like parallel plate, and CG is a CCD cover glass having a form like plane plate.

The zoom optical system of the embodiment 3 is constituted by having a lens group, a filter FL, a cover glass CG and CCD. The zoom optical system comprises, in order from an object side, a first lens group G1 as lens group A, an aperture stop S, a second lens group G2 as lens group B, a third lens group G3 as lens group C, and a fourth lens group G4 as lens group D.

The first lens group G1 consists of a cemented lens in which a double concave lens L11 and a positive meniscus lens L12 having a concave surface directed toward the object side are cemented, and it is constituted with one negative lens component as a whole. As for the cemented lens, each of surfaces contacting with air is an aspherical surface. The positive meniscus lens L12 having concave surface directed toward the object side is a lens in which an energy hardening type resin is used, and it is formed on the double concave lens L11. The second lens group G2 consists of a double convex lens L21, and a cemented lens in which a double convex lens L22 and a double concave lens L23 and it has positive refracting power as a whole. The third lens group G3 consists of a double concave lens L31. The double concave lens L31 has an aspherical surface directed toward the object side. The fourth lens group G4 consists of a double convex lens L41, which has an aspherical surface directed toward the object side.

When magnification from a wide angle end to a telephoto end is carried out, the first lens group G1 moves toward the image side along the optical axis at first, and then it stops moving when it reaches at a middle position. Meanwhile, the second lens group G2 and the aperture stop S move together simply toward the object side along the optical axis so that a distance between the first lens group G1 and the second group G2 may be narrowed. The third lens group G3 moves simply along the optical axis toward the image side, and then it stops moving when it reaches at the middle position. Meanwhile, the fourth lens group G4 moves simply toward the image side so that a distance to the third lens group G3 may be enlarged, and the third lens group G3 and the fourth lens group G4 move together while changing a relative distance between them when focusing is carried out. A distance between the third lens group G3 and the fourth lens group G4 is narrowed when the third lens group G3 and the fourth lens group G4 are moved for focusing at nearer object point in a state such that the first lens group G1 and the second lens group G2 are stopped moving.

Numerical data of the zoom optical system of the embodiment 3 are shown below.

Numerical data 3

| | | | |
|---|---|---|---|
| $r_1 = -13.9027$ (AP) | $d_1 = 0.8000$ | $n_{d1} = 1.49700$ | $v_{d1} = 81.54$ |
| $r_2 = 14.2424$ | $d_2 = 0.3849$ | $n_{d2} = 1.63494$ | $v_{d2} = 23.22$ |
| $r_3 = 22.7579$ (AP) | $d_3 = D3$ | | |
| $r_4 = \infty$ (AS) | $d_4 = 0.3000$ | | |
| $r_5 = 8.4540$ (AP) | $d_5 = 1.8463$ | $n_{d5} = 1.83481$ | $v_{d5} = 42.71$ |
| $r_6 = -19.5689$ (AP) | $d_6 = 0.0791$ | | |
| $r_7 = 6.5193$ (AP) | $d_7 = 1.7246$ | $n_{d7} = 1.88300$ | $v_{d7} = 40.76$ |
| $r_8 = -3802.8463$ | $d_8 = 0.1500$ | $n_{d8} = 1.83917$ | $v_{d8} = 23.86$ |
| $r_9 = 3.3456$ (AP) | $d_9 = D9$ | | |
| $r_{10} = -30.3101$ (AP) | $d_{10} = 0.5000$ | $n_{d10} = 1.73077$ | $v_{d10} = 40.51$ |
| $r_{11} = 54.2118$ | $d_{11} = D11$ | | |
| $r_{12} = 85.0269$ (AP) | $d_{12} = 1.3296$ | $n_{d12} = 1.88300$ | $v_{d12} = 40.76$ |
| $r_{13} = -9.6000$ | $d_{13} = D13$ | | |
| $r_{14} = \infty$ | $d_{14} = 0.5000$ | $n_{d14} = 1.54771$ | $v_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $v_{d16} = 64.14$ |
| $r_{17} = \infty$ | $d_{17} = D17$ | | |
| $r_{18} = \infty$ (IM) | | | |

Aspherical coefficient

Surface number 1
$k = -2.5695$
$A_2 = 0$   $A_4 = 0$   $A_6 = 4.6879 \times 10^{-6}$
$A_8 = -5.0343 \times 10^{-8}$   $A_{10} = 0$ Surface number 3
$k = -11.8389$
$A_2 = 0$   $A_4 = 1.1100 \times 10^{-4}$   $A_6 = 4.8835 \times 10^{-6}$
$A_8 = -2.2353 \times 10^{-8}$   $A_{10} = 0$ Surface number 5
$k = -1.4160$
$A_2 = 0$   $A_4 = -2.2154 \times 10^{-4}$   $A_6 = 1.6991 \times 10^{-6}$
$A_8 = 0$   $A_{10} = 0$ Surface number 6
$k = -63.5361$
$A_2 = 0$   $A_4 = -2.0102 \times 10^{-4}$   $A_6 = 2.9251 \times 10^{-6}$
$A_8 = 0$   $A_{10} = 0$ Surface number 9
$k = -0.1169$
$A_2 = 0$   $A_4 = -2.6340 \times 10^{-3}$   $A_6 = 1.0018 \times 10^{-4}$
$A_8 = -1.8484 \times 10^{-5}$   $A_{10} = 0$ Surface number 10
$k = 0$
$A_2 = 0$   $A_4 = -3.8356 \times 10^{-4}$   $A_6 = 7.5898 \times 10^{-6}$
$A_8 = 0$   $A_{10} = 0$ Surface number 12
$k = 0$
$A_2 = 0$   $A_4 = -3.1306 \times 10^{-4}$   $A_6 = 0$
$A_8 = 0$   $A_{10} = 0$ Refractive index of component of the negative lens $L_{AN}$ according to wavelength nd = 1.496999   nC = 1.495136   nF = 1.501231   ng = 1.504506
nh = 1.507205

Refractive index of component of the positive lens $L_{AP}$ according to wavelength nd = 1.634940   nC = 1.627290   nF = 1.654640   ng = 1.672908
nh = 1.689873

Zoom data (D0 (distance from an object to the first surface) is infinity)

| | wide angle end | middle position | telephoto end |
|---|---|---|---|
| F | 6.41996 | 11.01022 | 18.48913 |
| fno | 1.8794 | 2.4961 | 3.4414 |
| D0 | ∞ | ∞ | ∞ |
| D3 | 15.05021 | 7.39373 | 2.69994 |
| D9 | 2.00138 | 6.40192 | 11.09864 |
| D11 | 2.46286 | 2.33064 | 3.08616 |
| D13 | 3.37105 | 2.42127 | 1.64550 |
| D17 | 0.50001 | 0.49990 | 0.49994 |

Embodiment 4

Figure 7A:
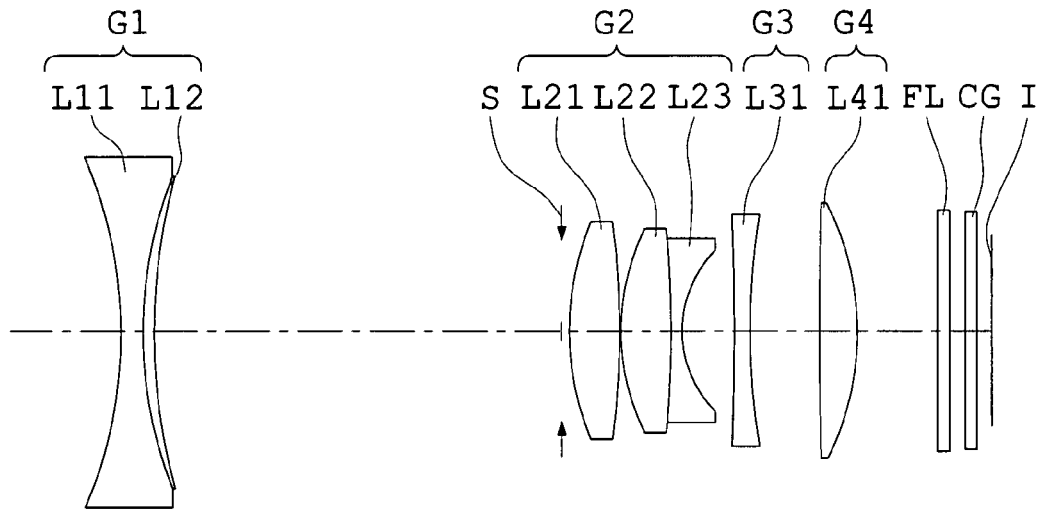
FIGS. 7A, 7B and 7C are sectional views showing an optical arrangement developed along an optical axis at a wide angle end, a middle position and a telephoto end respectively of the zoom lens system when focusing is carried out at the infinite object point in an embodiment 4 according to the present invention.
Figure 7B:
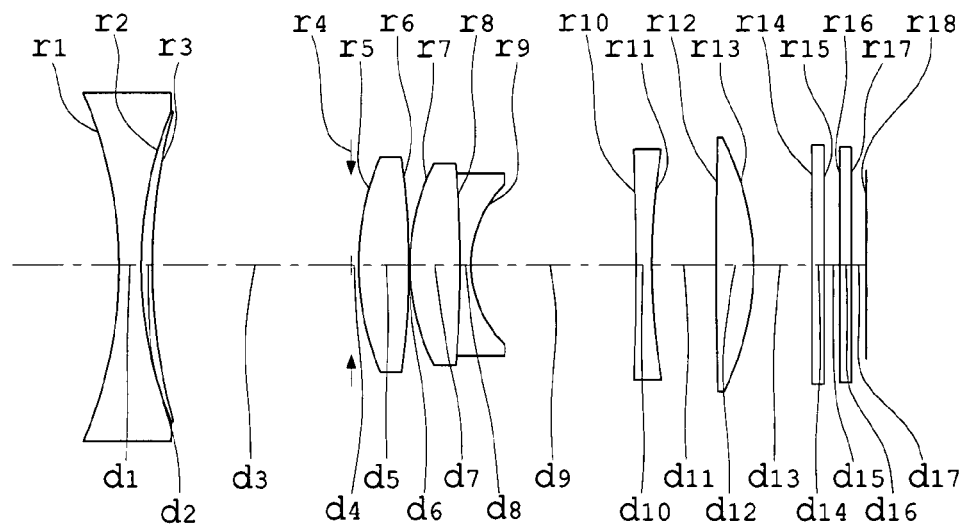
Figure 7C:
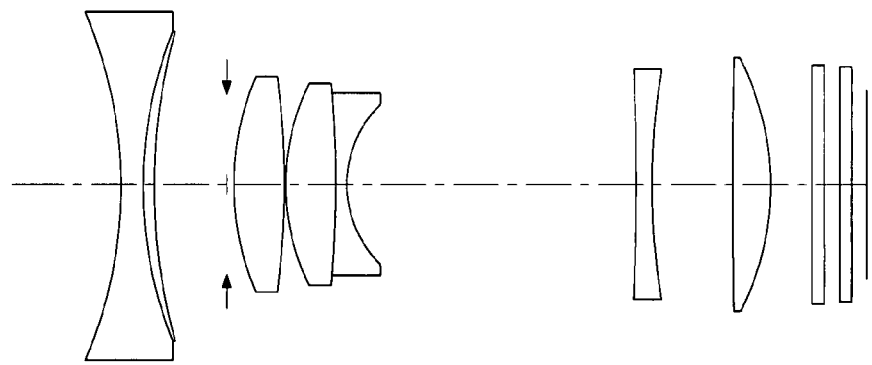

FIGS. 7A, 7B and 7C are sectional views showing an optical arrangement developed along an optical axis at a wide angle end, a middle position and a telephoto end respectively of the zoom lens system when focusing is carried out at the infinite object point in an embodiment 4 according to the present invention. FIGS. 8A~8D, 8E~8H, and 8I~8L are figures showing spherical aberration, astigmatism, and magnification chromatic aberration respectively, when focusing is carried out at the infinite object point of the zoom optical system of FIG. 7, and show states in the wide angle end, the middle position, and the telephoto end, respectively. In FIG. 7, I is an imaging surface of CCD which is an electronic imaging element, S is an aperture stop, FL is a filter having a form like parallel plate, and CG is a CCD cover glass having a form like plane plate.

The zoom optical system of the embodiment 4 is constituted by having a lens group, a filter FL, a cover glass CG and CCD. The zoom optical system comprises, in order from an object side, a first lens group G1 as lens group A, an aperture stop S, a second lens group G2 as lens group B, a third lens group G3 as lens group C, and a fourth lens group G4 as lens group D.

The first lens group G1 consists of a cemented lens in which a double concave lens L11 and a positive meniscus lens L12 having a convex surface directed toward the object side (namely, a concave surface directed toward the image side) are cemented, and it has negative refracting power as a whole. As for the cemented lens, each of surfaces contacting with air is an aspherical surface. The positive meniscus lens L12 having a concave surface directed toward the object side is a lens in which an energy hardening type resin is used, and it is formed on the double concave lens L11. The second lens group G2 consists of a double convex lens L21, and a cemented lens in which a double convex lens L22 and a double concave lens L23 are cemented, and it has positive refracting power as a whole. The third lens group G3 consists of a double concave lens L31. The double concave lens L31 has an aspherical surface directed toward the object side. The fourth lens group G4 consists of a double convex lens L41 which has an aspherical surface directed toward the object side.

When magnification from a wide angle end to a telephoto end is carried out, the first lens group G1 moves toward the image side, and the second lens group G2 and an aperture stop S move together simply along the optical axis toward an the object side so that a distance to the first lens group G1 may be narrowed. The third lens group G3 moves simply toward the image side along the optical axis at first, and then it moves toward the object side, that is to say, it moves two directions toward the image side and the object side along the optical axis. The fourth lens group G4 moves simply toward the image side along the optical axis. The third lens group G3 and the fourth lens group G4 moves together while changing a relative distance between them when focusing is carried out.

A distance between the third lens group G3 and the fourth lens group G4 is narrowed when the third lens group G3 and the fourth lens group G4 are moved for focusing at nearer object point in a state such that the first lens group G1 and the second lens group G2 are stopped moving.

Numerical data 4

| | | | |
|---|---|---|---|
| $r_1 = -13.7119$ (AP) | $d_1 = 0.8000$ | $n_{d1} = 1.49700$ | $v_{d1} = 81.54$ |
| $r_2 = 15.4002$ | $d_2 = 0.3349$ | $n_{d2} = 1.63494$ | $v_{d2} = 23.22$ |
| $r_3 = 22.7796$ (AP) | $d_3 = D3$ | | |
| $r_4 = \infty$ (As) | $d_4 = 0.3000$ | | |
| $r_5 = 7.7949$ (AP) | $d_5 = 1.8356$ | $n_{d5} = 1.83481$ | $v_{d5} = 42.71$ |
| $r_6 = -25.0309$ (AP) | $d_6 = 0.0791$ | | |
| $r_7 = 7.5236$ | $d_7 = 1.7065$ | $n_{d7} = 1.88300$ | $v_{d7} = 40.76$ |
| $r_8 = -46.0680$ | $d_8 = 0.5000$ | $n_{d8} = 1.83917$ | $v_{d8} = 23.86$ |
| $r_9 = 3.5999$ (AP) | $d_9 = D9$ | | |
| $r_{10} = -293.7224$ (AP) | $d_{10} = 0.5000$ | $n_{d10} = 1.73077$ | $v_{d10} = 40.51$ |
| $r_{11} = 19.9208$ | $d_{11} = D11$ | | |
| $r_{12} = 68.7493$ (AP) | $d_{12} = 1.3578$ | $n_{d12} = 1.88300$ | $v_{d12} = 40.76$ |
| $r_{13} = -9.6000$ | $d_{13} = D13$ | | |
| $r_{14} = \infty$ | $d_{14} = 0.5000$ | $n_{d14} = 1.54771$ | $v_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $v_{d16} = 64.14$ |
| $r_{17} = \infty$ | $d_{17} = D17$ | | |
| $r_{18} = \infty$ (IM) | | | |

Aspherical coefficient

Surface number 1
$k = 1.6574$
$A_2 = 0$  $A_4 = 0$  $A_6 = 1.3203 \times 10^{-5}$
$A_8 = -1.2899 \times 10^{-7}$  $A_{10} = 0$ Surface number 3
$k = -10.1025$
$A_2 = 0$  $A_4 = -8.1196 \times 10^{-5}$  $A_6 = 1.2184 \times 10^{-5}$
$A_8 = -9.7163 \times 10^{-8}$  $A_{10} = 0$ Surface number 5
$k = -1.1112$
$A_2 = 0$  $A_4 = -1.2637 \times 10^{-4}$  $A_6 = -1.1430 \times 10^{-6}$
$A_8 = 0$  $A_{10} = 0$ Surface number 6
$k = -82.5216$
$A_2 = 0$  $A_4 = -1.6302 \times 10^{-4}$  $A_6 = 1.9882 \times 10^{-6}$
$A_8 = 0$  $A_{10} = 0$ Surface number 9
$k = 0.0311$
$A_2 = 0$  $A_4 = -1.6562 \times 10^{-3}$  $A_6 = 5.6636 \times 10^{-5}$
$A_8 = -1.5248 \times 10^{-5}$  $A_{10} = 0$ Surface number 10
$k = 0$
$A_2 = 0$  $A_4 = -4.2171 \times 10^{-4}$  $A_6 = 1.3121 \times 10^{-5}$
$A_8 = 0$  $A_{10} = 0$ Surface number 12
$k = 0$
$A_2 = 0$  $A_4 = -2.7551 \times 10^{-4}$  $A_6 = 0$
$A_8 = 0$  $A_{10} = 0$ Refractive index of component of the negative lens $L_{AN}$ according to wavelength nd = 1.496999 nC = 1.495136 nF = 1.501231 ng = 1.504506
nh = 1.507205

Refractive index of component of the positive lens $L_{AP}$ according to wavelength nd = 1.634940 nC = 1.627290 nF = 1.654640 ng = 1.672908
nh = 1.689873

Zoom data (D0 (distance from an object to the first surface) is infinity)

| | wide angle end | middle position | telephoto end |
|---|---|---|---|
| F | 6.41994 | 11.01010 | 18.48940 |
| fno | 1.9985 | 2.6417 | 3.6284 |
| D0 | ∞ | ∞ | ∞ |
| D3 | 15.17457 | 7.44838 | 2.70819 |
| D9 | 1.90216 | 6.00854 | 10.63598 |
| D11 | 2.52277 | 2.40859 | 3.03504 |
| D13 | 2.98667 | 2.17222 | 1.60000 |
| D17 | 0.50000 | 0.50006 | 0.49954 |

Embodiment 5

Figure 9A:
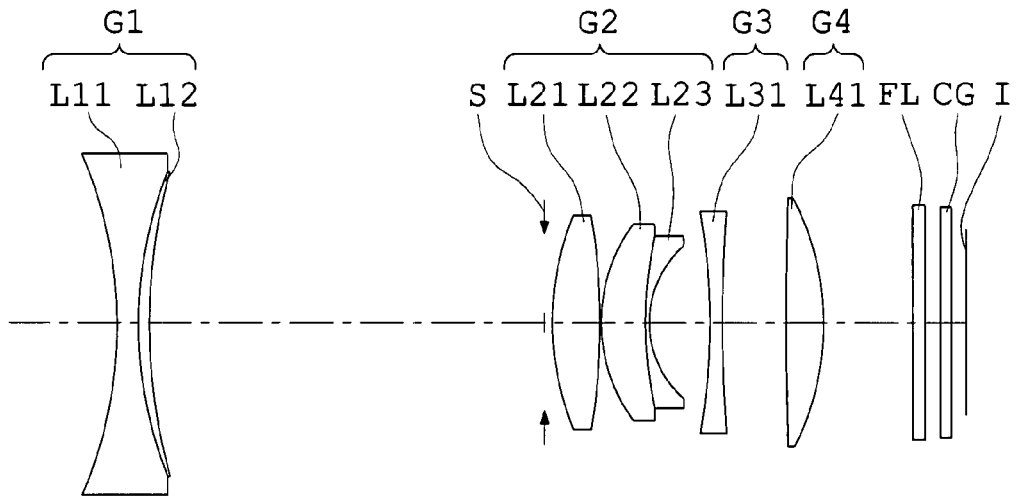
FIGS. 9A, 9B and 9C are sectional views showing an optical arrangement developed along an optical axis at a wide angle end, a middle position and a telephoto end respectively of the zoom lens system when focusing is carried out at the infinite object point in an embodiment 5 according to the present invention.
Figure 9B:
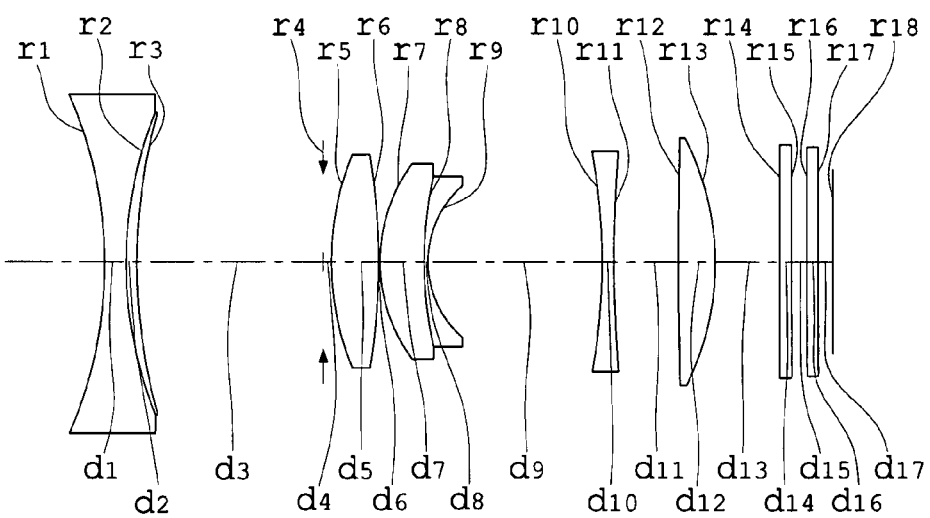
Figure 9C:
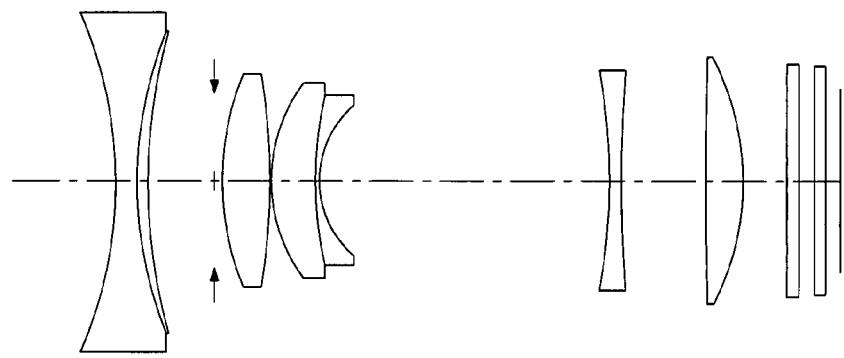

FIGS. 9A, 9B and 9C are sectional views showing an optical arrangement developed along an optical axis at a wide angle end, a middle position and a telephoto end respectively of the zoom lens system when focusing is carried out at the infinite object point in an embodiment 5 according to the present invention. FIGS. 10A~10D, 10E~10H, and 10I-10L are figures showing spherical aberration, astigmatism, distortion, and chromatic aberration of magnification respectively, when focusing is carried out at the infinite object point of the zoom optical system of FIG. 9, and show states in the wide angle end, the middle position, and the telephoto end respectively. In FIG. 9, I is an imaging surface of CCD which is an electronic imaging element, S is an aperture stop, FL is a filter having a form like parallel plate, and CG is a CCD cover glass having a form like plane plate.

The zoom optical system of the embodiment 5 is constituted by having a lens group, a filter FL, a cover glass CG and CCD. The zoom optical system comprises, in order from an object side, a first lens group G1 as lens group A, an aperture stop S, a second lens group G2 as lens group B, a third lens group G3 as lens group C, and a fourth lens group G4 as lens group D.

The first lens group G1 consists of a cemented lens in which a double concave lens L11 and a positive meniscus lens L12 having a convex surface directed toward the object side (namely, a concave surface directed toward the image side) are cemented, and it has negative refracting power as a whole. As for the cemented lens, each of surfaces contacting with air is an aspherical surface. The positive meniscus lens L12 having a convex surface directed toward the object side is a lens in which an energy hardening type resin is used, and it is formed on the double concave lens L11. The second lens group G2 consists of a double convex lens L21, and a cemented lens in which a double convex lens L22 and a double concave lens L23 are cemented, and it has positive refracting power. The third lens group G3 consists of a double concave lens L31. The double concave lens L31 has an aspherical surface directed toward the object side. The fourth lens group G4 consists of a double convex lens L41 which has an aspherical surface directed toward the object side.

When magnification from a wide angle end to a telephoto end is carried out, the first lens group G1 moves toward the image side along the optical axis, and the second lens group G2 and the aperture stop S move together simply along the optical axis toward the object side so that a distance to the first lens group G1 may be narrowed. The third lens group G3 moves toward the image side along the optical axis at first, and then it stops moving when it reaches at a middle position, and the fourth lens group G4 keeps a constant distance to the third lens group G3 when it reaches at the middle position, and after it reaches at the middle position it moves simply toward the image side so that a distance to the third lens group G3 may enlarged. The third lens group G3 and the fourth lens group G4 move together changing a relative distance while focusing is carried out. A distance between the third lens group G3 and the fourth lens group G4 is narrowed when the third lens group G3 and the fourth lens group G4 are moved for focusing at nearer object point in a state such that the first lens group G1 and the second lens group G2 are stopped moving. Next, numerical data of optical components of the zoom optical system of the embodiment 5 are shown below.

Numerical data 5

| | | | |
|---|---|---|---|
| $r_1 = -12.9349$ (AP) | $d_1 = 0.8000$ | $n_{d1} = 1.49700$ | $v_{d1} = 81.54$ |
| $r_2 = 14.0068$ | $d_2 = 0.4202$ | $n_{d2} = 1.63494$ | $v_{d2} = 23.22$ |
| $r_3 = 26.1436$ (AP) | $d_3 = D3$ | | |
| $r_4 = \infty$ (As) | $d_4 = 0.3000$ | | |
| $r_5 = 9.3008$ (AP) | $d_5 = 1.7362$ | $n_{d5} = 1.83481$ | $v_{d5} = 42.71$ |
| $r_6 = -22.3575$ (AP) | $d_6 = 0.0791$ | | |
| $r_7 = 5.7732$ | $d_7 = 1.5976$ | $n_{d7} = 2.04000$ | $v_{d7} = 40.00$ |

-continued

| | | | |
|---|---|---|---|
| $r_8 = 12.2011$ | $d_8 = 0.1500$ | $n_{d8} = 1.90680$ | $v_{d8} = 21.15$ |
| $r_9 = 3.2973$ (AP) | $d_9 = D9$ | | |
| $r_{10} = -28.7396$ (AP) | $d_{10} = 0.5000$ | $n_{d10} = 1.73077$ | $v_{d10} = 40.51$ |
| $r_{11} = 57.8428$ | $d_{11} = D11$ | | |
| $r_{12} = 88.1385$ (AP) | $d_{12} = 1.3300$ | $n_{d12} = 1.88300$ | $v_{d12} = 40.76$ |
| $r_{13} = -9.6000$ | $d_{13} = D13$ | | |
| $r_{14} = \infty$ | $d_{14} = 0.5000$ | $n_{d14} = 1.54771$ | $v_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $v_{d16} = 64.14$ |
| $r_{17} = \infty$ | $d_{17} = D17$ | | |
| $r_{18} = \infty$ (IM) | | | |

Aspherical coefficient

Surface number 1
$k = -6.5076$
$A_2 = 0$  $A_4 = 0$  $A_6 = 7.3145 \times 10^{-7}$
$A_8 = 3.2389 \times 10^{-9}$  $A_{10} = 0$ Surface number 3
$k = -10.1897$
$A_2 = 0$  $A_4 = 2.5563 \times 10^{-4}$  $A_6 = -1.1974 \times 10^{-6}$
$A_8 = 4.2009 \times 10^{-8}$  $A_{10} = 0$ Surface number 5
$k = -1.8853$
$A_2 = 0$  $A_4 = -2.8576 \times 10^{-4}$  $A_6 = 2.3333 \times 10^{-6}$
$A_8 = 0$  $A_{10} = 0$ Surface number 6
$k = -79.0789$
$A_2 = 0$  $A_4 = -3.3949 \times 10^{-4}$  $A_6 = 5.6336 \times 10^{-6}$
$A_8 = 0$  $A_{10} = 0$ Surface number 9
$k = -0.1243$
$A_2 = 0$  $A_4 = -2.0875 \times 10^{-3}$  $A_6 = 8.0147 \times 10^{-5}$
$A_8 -1.7393 \times 10^{-5}$  $A_{10} = 0$ Surface number 10
$k = 0$
$A_2 = 0$  $A_4 = -4.0527 \times 10^{-4}$  $A_6 = 6.6267 \times 10^{-6}$
$A_8 = 0$  $A_{10} = 0$ Surface number 12
$k = 0$
$A_2 = 0$  $A_4 = -3.0240 \times 10^{-4}$  $A_6 = 0$
$A_8 = 0$  $A_{10} = 0$ Refractive index of component of the negative lens $L_{AN}$ according to wavelength nd = 1.496999 nC = 1.495136 nF = 1.501231 ng = 1.504506
nh = 1.507205

Refractive index of component of the positive lens $L_{AP}$ according to wavelength nd = 1.634940 nC = 1.627290 nF = 1.654640 ng = 1.672908
nh = 1.689873

Zoom data(D0 (distance from an object to the first surface) is infinity)

| | wide angle end | middle position | telephoto end |
|---|---|---|---|
| F | 6.42002 | 11.01033 | 18.48966 |
| fno | 1.8657 | 2.4657 | 3.3907 |
| D0 | ∞ | ∞ | ∞ |
| D3 | 15.06615 | 7.17979 | 2.39997 |
| D9 | 2.26600 | 6.47996 | 11.11473 |
| D11 | 2.35470 | 2.37949 | 3.15731 |
| D13 | 3.40002 | 2.48924 | 1.66172 |
| D17 | 0.49999 | 0.49993 | 0.49990 |

Next, parameter values corresponding to each of the embodiments mentioned above according to the present invention are shown in the following table 1.

TABLE 1

| | Embodiment 1 | Embodiment 2 | Embodiment 3 | Embodiment 4 | Embodiment 5 |
|---|---|---|---|---|---|
| Fw | 6.42001 | 6.42000 | 6.41996 | 6.41994 | 6.42002 |
| Y10 | 3.6 | 3.6 | 3.6 | 3.6 | 3.6 |
| $z_{AF}(4.494)$ | −0.70327 | −0.69609 | −0.66853 | −0.71087 | −0.67517 |
| $z_{AC}(4.494)$ | 0.78934 | 0.77267 | 0.72760 | 0.67029 | 0.74051 |
| $z_{AR}(4.494)$ | 0.51930 | 0.44459 | 0.48650 | 0.46083 | 0.46447 |
| $|z_{AR}(h) - z_{AC}(h)|/tp$ at h = 4.494 | 0.6373 | 0.6174 | 0.6264 | 0.6254 | 0.6569 |
| tp/tn | 0.5296 | 0.6643 | 0.4811 | 0.4816 | 0.5253 |
| $k_{AF}$ | −2.8817 | −6.7681 | −2.5695 | 1.6574 | −6.5076 |
| $k_{AR}$ | −2.9323 | −7.1823 | −11.8389 | −10.1025 | −10.1897 |
| $z_{AF}(h)/z_{AR}(h)$ at h = 4.494 | −1.3543 | −1.5657 | −1.3742 | −1.5426 | −1.4536 |
| ndp | 1.63494 | 1.63494 | 1.63494 | 1.63494 | 1.63494 |
| v dp | 23.22 | 23.22 | 23.22 | 23.22 | 23.22 |
| Θ gFp | 0.6679 | 0.6679 | 0.6679 | 0.6679 | 0.6679 |
| Θ hgp | 0.6203 | 0.6203 | 0.6203 | 0.6203 | 0.6203 |
| $_{AVE}nd_{2P}$ | 1.83481 | 1.794885 | 1.858905 | 1.858905 | 1.937405 |
| $_{AVE}vd_{2N}$ | 22.76 | 24.87 | 23.86 | 23.86 | 21.15 |
| $Nd_{4P}$ | 1.83481 | 1.83481 | 1.88300 | 1.88300 | 1.88300 |
| $vd_{4P}$ | 42.71 | 42.71 | 40.76 | 40.76 | 40.76 |
| $d_{CD}/fw$ | 0.3668 | 0.3718 | 0.4811 | 0.3930 | 0.3668 |
| $Y_{07}$ | 2.52 | 2.52 | 2.52 | 2.52 | 2.52 |
| $\tan \omega_{07w}$ | −0.41890 | −0.41885 | −0.42062 | −0.42215 | −0.41985 |
| $(R_{CF} + R_{CR})/(R_{CF} - R_{CR})$ | 0.2041 | −0.9128 | −0.2828 | 0.8730 | −0.3361 |
| $(R_{DF} + R_{DR})/(R_{DF} - R_{DR})$ | 0.7383 | 0.7774 | 0.7971 | 0.7549 | 0.8036 |

The optical zoom optical system according to the present invention as mentioned above can be used in a photographing apparatus in which photographing of an objective image carried out by an electronic imaging element (CCD, CMOS), especially a digital camera and a video camera, a personal computer as an example of an information processing apparatus, a telephone, a personal digital assistant, particularly, a cellular phone that is useful for carrying and the like.

A digital camera will be illustrated below as an embodiment.

Figure 11:
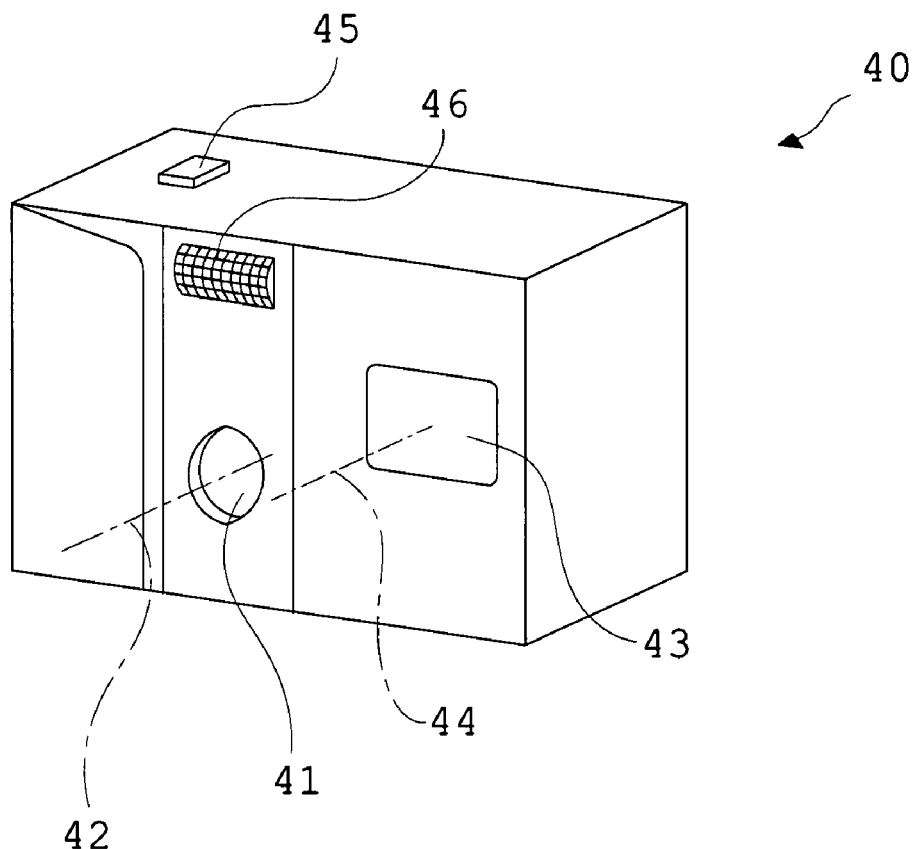
FIG. 11 is a front perspective diagram showing an outside view of a digital camera using the zoom optical system of the present invention.
Figure 12:
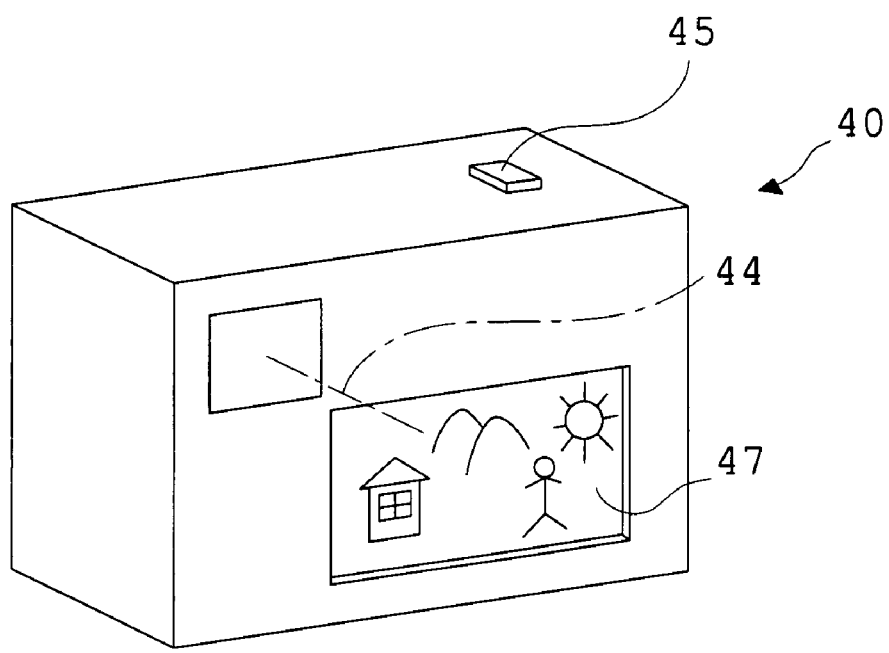
FIG. 12 is a back perspective diagram of the digital camera of FIG. 11.
Figure 13:
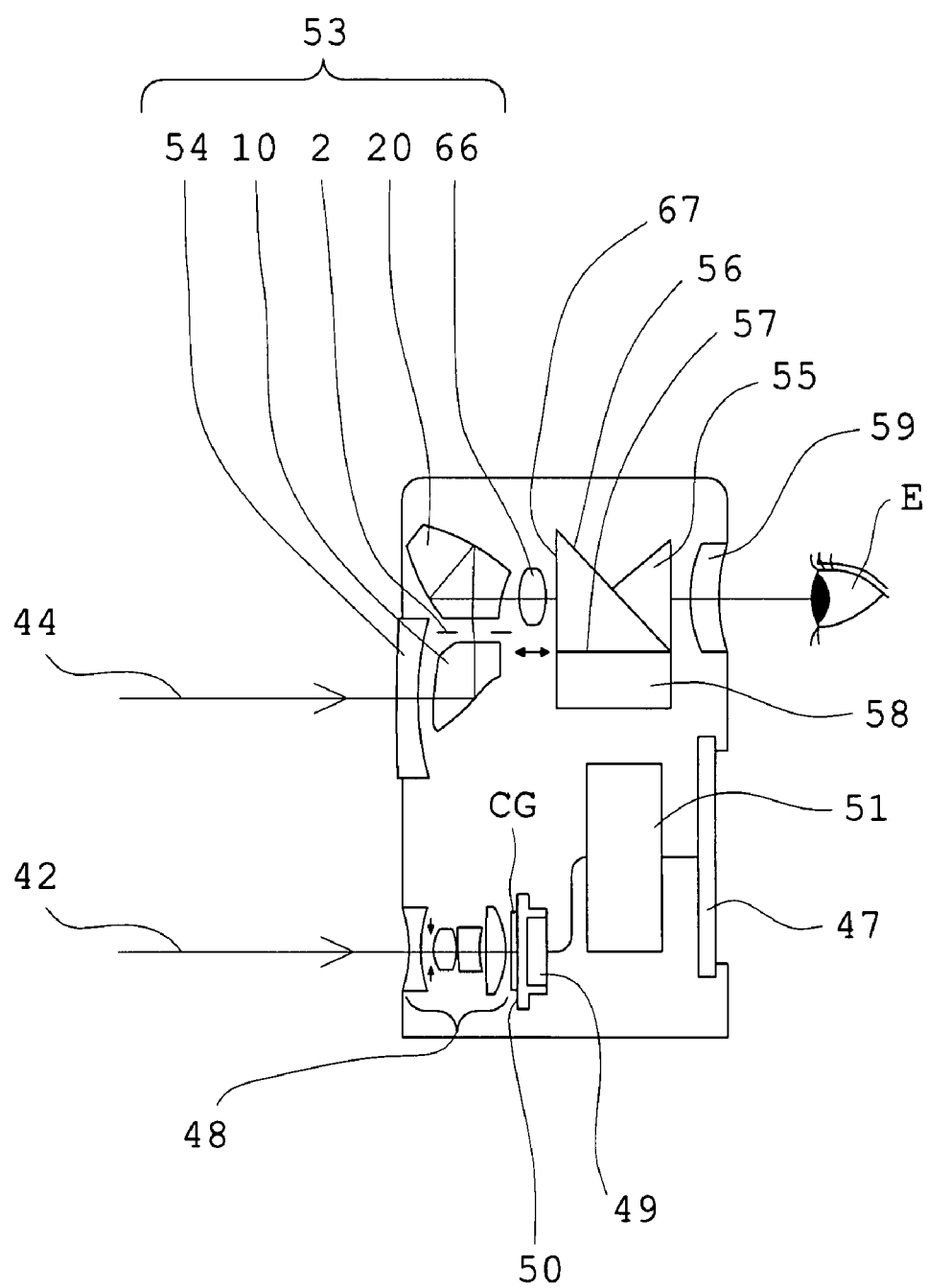
FIG. 13 is a sectional view showing an optical composition of the digital camera 4 of FIG. 11.

FIGS. 11-13 are conceptual diagrams of composition in which an image forming optical system of the present invention is incorporated in the photographing optical system 41 of the digital camera. FIG. 11 is a front perspective diagram showing the outside view of the digital camera 40, FIG. 12 is a back perspective diagram of the same, and FIG. 13 is a sectional view showing an optical composition of the digital camera 40.

In the case of this example, the digital camera 40 comprises the photographical optical system 41 which has a light path 42 for photographing, a finder optical system 43 which has the light path for finder 44, a shutter 45, a flash 46, and a liquid crystal display monitor 47 and the like. When a photographing person presses a shutter 45 arranged in an upper part of the camera 40, by interlocking with such action, photographing is carried out through the photographical optical system 41, for example, the zoom optical system of the embodiment 1.

An object image formed by the photographical optical system 41 is formed on an imaging surface of CCD 49. The object image received by the CCD 49 is displayed as an electronic image on the liquid crystal display monitor 47 provided on the backside of the camera through an image processing means 51. A memory means or the like is arranged in the image processing means 51, and a photographed electronic image can be recorded also. The memory means may be provided independently from the image processing means 51, or may be constructed so that the image is electronically recorded and written by a floppy disk (registered trade mark), a memory card, MO, etc.

Furthermore, an objective optical system for finder 53 is arranged on the finder optical path 44. This objective optical system for finder 53 consists of a cover lens 54, a first prism 10, an aperture stop S, a second prism 20, a lens for focusing 66.

An object image is formed on the imaging surface 67 by this objective optical system for finder 53. This object image is formed on a view frame 57 of a Polo prism 55 which is an image erecting component. Behind the Porro prism 55, an eye piece optical system 59 which introduces an erected image into an observer's eye E is arranged.

According to the digital camera 40 constituted in this way, an electronic imaging apparatus having a miniaturized and thin zoom lens in which as the number of lenses of the photographical optical system 41 is reduced can be realized.

The present invention is suitable for fields of a zoom optical system which is good for an electronic imaging optical system where thinning of shape, high image forming performance, and large aperture ratio are required to be satisfied simultaneously in order to enable to take a photograph finely, also even in an environment with a little light, and an electronic imaging apparatus having the zoom optical system.

What is claimed is:

1. A zoom optical system comprises
in order from an object side,
a lens group A that consists of one cemented lens component in which surfaces contacted with air is an aspherical surface, and has negative refracting power as a whole,
a lens group B that consists of one positive single lens and one cemented lens component, and has positive refracting power as a whole,
a lens group C that consists of one negative lens having an aspherical surface, and
a lens group D that consists of one positive lens having an aspherical surface,
wherein each of lens groups is moved changing each relative distance among the lens groups when magnification is carried out.

2. The zoom optical system according to the claim 1, wherein the lens group A consists of a cemented lens component in which a positive lens $L_{AP}$ and a negative lens $L_{AN}$ are cemented, the negative lens $L_{AN}$ has a double concave surface, and the positive lens $L_{AP}$ has a meniscus form having a concave surface directed toward an image side.

3. The zoom optical system according to the claim 2, wherein the positive lens $L_{AP}$ is a lens using an energy hardening type resin which is formed directly on the negative lens $L_{AN}$.

4. The zoom optical system according to the claim 1 or 2, wherein the cemented lens component of the lens group A is constituted such that the negative lens and the positive lens are cemented in order from an object side.

5. The zoom optical system of the claim 1 or 2 satisfying the following condition (2), when an aspherical surface is expressed by the following condition (1), where a direction of an optical axis is z, a direction which intersects perpendicularly to the optical axis is h, a cone coefficient is k, and an aspherical coefficient is represented by A4, A6, A8, and A10, and a radius of curvature of spherical surface component on the optical axis is R, $$z = \frac{h^2}{R\left[1+\left\{1-(1+k)\frac{h^2}{R^2}\right\}^{\frac{1}{2}}\right]} + A_4h^4 + A_6h^6 + A_8h^8 + A_{10}h^{10} + \quad (1)$$

$$0.1 \leq |z_{AR}(h)-z_{AC}(h)|/tp \leq 0.96 \quad (2)$$

here, $z_{AC}$ is a form of the surface at a cemented side in the positive lens $L_{AP}$; $z_{AR}$ is a form of the surface at an air-contact side in the positive lens $L_{AP}$, all of which are forms according to the condition (1); h is expressed by h=0.7fw when the focal length of the whole zoom optical system at the wide angle end is set to fw; tp is a thickness on the optical axis of the positive lens $L_{AP}$; and z(0)=0 always.

6. The zoom optical system of the claim 1 or 2 satisfying the following conditions (4), (5) and (6), when an aspherical surface is expressed by the following condition (1), where a direction of an optical axis is z, a direction which intersects perpendicularly to the optical axis is h, a cone coefficient is k, and an aspherical coefficient is represented by A4, A6, A8, and A10, and a radius of curvature of spherical surface component on the optical axis is R, $$z = \frac{h^2}{R\left[1+\left\{1-(1+k)\frac{h^2}{R^2}\right\}^{\frac{1}{2}}\right]} + A_4h^4 + A_6h^6 + A_8h^8 + A_{10}h^{10} + \quad (1)$$

$$-50 \leq k_{AF} \leq 10 \quad (4)$$

$$-20 \leq k_{AR} \leq 20 \quad (5)$$

$$-8 \leq z_{AF}(h)/z_{AR}(h) \leq 2 \quad (6)$$

here, $k_{AF}$ is k value concerning a surface at the most object side in the lens group A; $k_{AR}$ is k value concerning a surface at the most image side in the lens group A, all of which are k values in the condition (1); $z_{AF}$ is k value concerning a surface at the most object side in the lens group A; $z_{AR}$ is k value concerning a surface at the most image side in the lens group A; and h is expressed by h=0.7fw when the focal length of the whole zoom optical system at the wide angle end is set to fw.

7. The zoom optical system according to the claim 1 or 2, wherein the lens group A moves toward two directions so that it may move toward an image side at first, and then it may move toward an object side along the optical axis when magnification from a wide angle end to a telephoto end is carried out.

8. The zoom optical system of the claim 1 wherein the lens group B satisfies the following conditions (13), and (14)

$$1.77 \leq {}_{AVE}nd_{2P} \quad (13)$$

$$vd_{2N} \leq 27 \quad (14)$$

here, $_{AVE}nd_{2P}$ is an average of refractive indexes (refractive indexes to d line) of all positive lenses in the lens group B, and $vd_{2N}$ is Abbe number (Abbe number in d line) of the negative lens in the lens group B.

9. The zoom optical system according to the claim 1, wherein the lens group D has a stronger curvature of a surface at the image side than that at the object side, and the surface at the object side is an aspherical surface.

10. The zoom optical system of the claim 9 satisfying the following condition (15), and (16)

$$1.77 \leq nd_{4P} \quad (15)$$

$$34 \leq vd_{4P} \quad (16)$$

here, $nd_{4P}$ is refractive index to d line of the lens group D; and $vd_{4P}$ is Abbe number in d line of the lens group D.

11. The zoom optical system of the claim 1 wherein the lens group C has a double concave surface.

12. The zoom optical system according to the claim 1 satisfying the following condition (17), wherein a distance on the optical axis between the lens group C and the lens group D is expressed by $d_{CD}$ when focusing is carried out at the infinite object point at the wide angle end satisfies the following condition (14)

$$0.2 \leq d_{CD}/fw \leq 1.2 \quad (17)$$

here, fw is a focal length of the whole zoom optical system at the wide angle end.

13. The zoom optical system according to the claim 9 or 10, wherein the lens group C and the lens group D move together so that a relative distance between them may be enlarged simply, or the lens group D may approach toward the image side when magnification from the wide angle end to the telephoto end carried out.

14. The zoom optical system according to the claim 11 or 12, wherein the lens group C and the lens group D move together so that a relative distance between them may be enlarged simply, or the lens group D may approach toward the image side when magnification from the wide angle end to the telephoto end carried out.

15. The zoom optical system according to the claim 9 or 10 wherein the lens group C and the lens group D move together while a mutual distance between them is changed when focusing is carried out.

16. The zoom optical system according to the claim 11 or 12 wherein the lens group C and the lens group D move together while a mutual distance between them is changed when focusing is carried out.

17. The zoom optical system according to the claim 15 or 16, wherein a distance between the lens C and the lens D is narrowed when focusing is carried out to an object point at nearer position by moving the lens group C and the lens group D in a state such that the lens group A and the lens group B are stopped.

18. An imaging apparatus provided with the zoom optical system according to the claim 1 or 2, and an image processing unit having an electronic imaging element arranged near an image forming position of the zoom optical system, wherein an image formed through the zoom optical system is photographed by the electronic imaging element, and an image data photographed by the electronic imaging element is processed electrically, and the image data can be outputted as an image data such that a shape of the image data was changed, and the following condition (20) is satisfied when focusing is carried out at nearly infinite object point $$0.7 < y_{07}/(fw \cdot \tan \omega_{07w}) < 0.94 \quad (20)$$

here, $y_{07}$ is expressed by $y_{07}=0.7y_{10}$ when a distance to the most distant point from a center (maximum image height) within an effective imaging surface of the electronic imaging element (within the surface in which photographing can be performed) is set to $y_{10}$; $\omega_{07w}$ is an angle to the optical axis of the direction of an object point corresponding to an image point connected to the position of $y_{07}$ from the center on the imaging surface at a wide angle end; and fw is a focal length of the whole zoom optical system at the wide angle end.

* * * * *